US012677123B2

(12) United States Patent
Haggai et al.

(10) Patent No.: US 12,677,123 B2
(45) Date of Patent: Jul. 7, 2026

(54) BLUETOOTH REPORT EVENTS FOR ULTRA LOW LATENCY

(71) Applicant: Intel Corporation, Santa Clara, CA (US)

(72) Inventors: Oren Haggai, Kefar Sava (IL); Yashodhara Devadiga, San Diego, CA (US); Nir Yizhak Balaban, Kfar Netter (IL); Prasanna Desai, Elfin Forest, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/940,049

(22) Filed: Sep. 8, 2022

(65) Prior Publication Data

US 2024/0089715 A1     Mar. 14, 2024

(51) Int. Cl.
*H04W 4/80* (2018.01)

(52) U.S. Cl.
CPC ..................................... *H04W 4/80* (2018.02)

(58) Field of Classification Search
CPC ...................................................... H04W 4/80
See application file for complete search history.

(56) References Cited

U.S. PATENT DOCUMENTS

| | | | | |
|---|---|---|---|---|
| 11,632,617 B2 * | 4/2023 | Yan | ......................... | H04W 4/80 |
| | | | | 381/74 |
| 2023/0135149 A1 * | 5/2023 | Krishnamurthy | ........................... | |
| | | | | H04W 56/0015 |
| | | | | 455/456.1 |

* cited by examiner

*Primary Examiner* — Tuan H Nguyen
(74) *Attorney, Agent, or Firm* — Viering, Jentschura & Partner mbB

(57) ABSTRACT

The present disclosure relates to a method of managing a data transmission from a second device to a first device, the method including: determining a reference time point for the data transmission from the second device to the first device; determining a time offset associated with the second device, wherein the reference time point and the time offset define a starting time point for the second device to start the data transmission; and carrying out the data transmission from the second device to the first device in accordance with the starting time point, wherein the data transmission includes transmitting isochronous data from the second device to the first device.

18 Claims, 17 Drawing Sheets

200

202

206

214    216

210

222

212    204

208

220-1

220-2    218

220-3

FIG. 3A
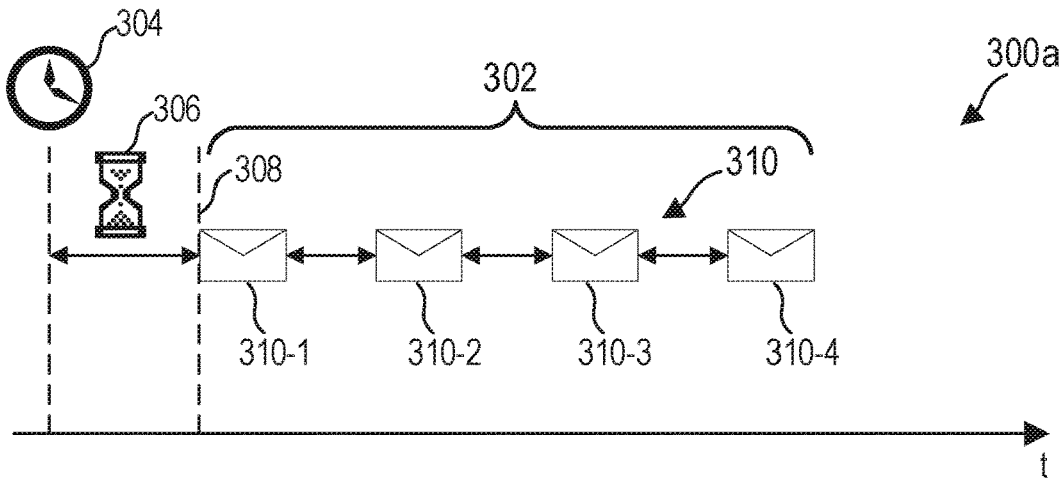
FIG. 3B
FIG. 3C
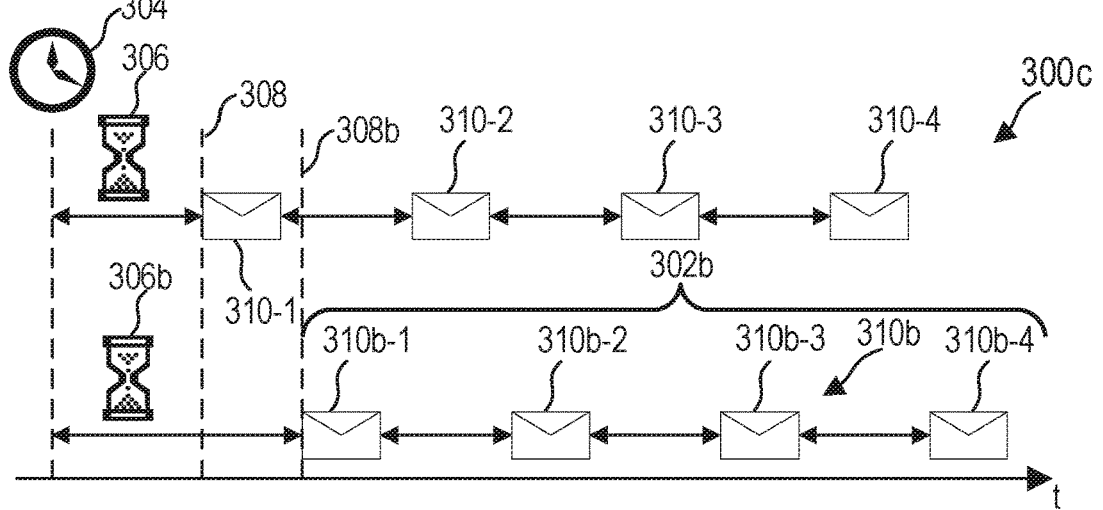

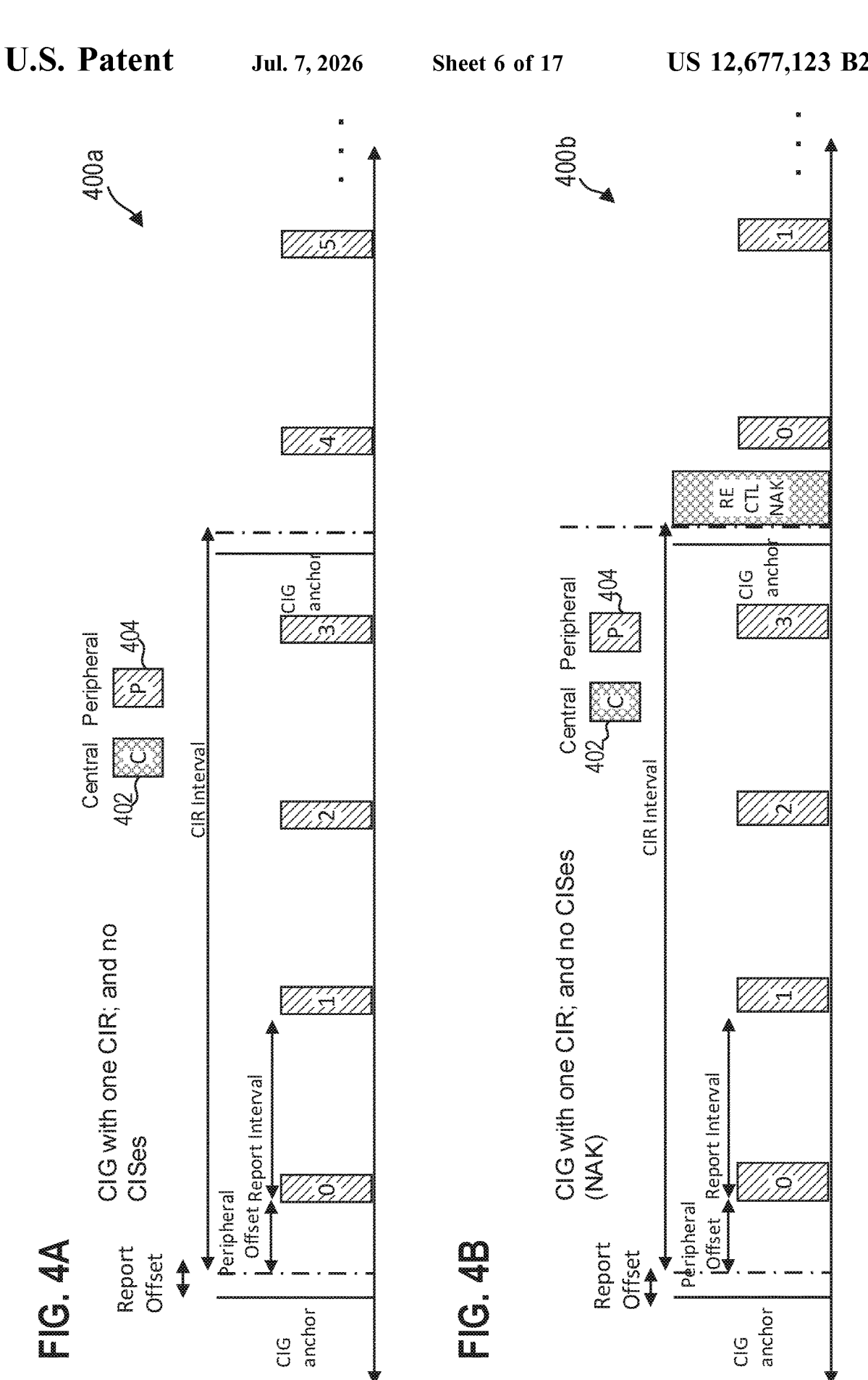

FIG. 4E

CIG with one CIS; and one CIR; from different peripherals

CIG with two CISes; and two CIRs; from 4 different peripherals

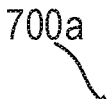

Defining a reference time point for the data transmission from the second device to the first device

710

Defining a time-offset associated with the second device; the reference time point and the time-offset define a starting time point for the second device to start the data transmission

720

Carrying out the data transmission from the second device to the first device in accordance with the starting time point; the data transmission includes transmitting isochronous data from the second device to the first device

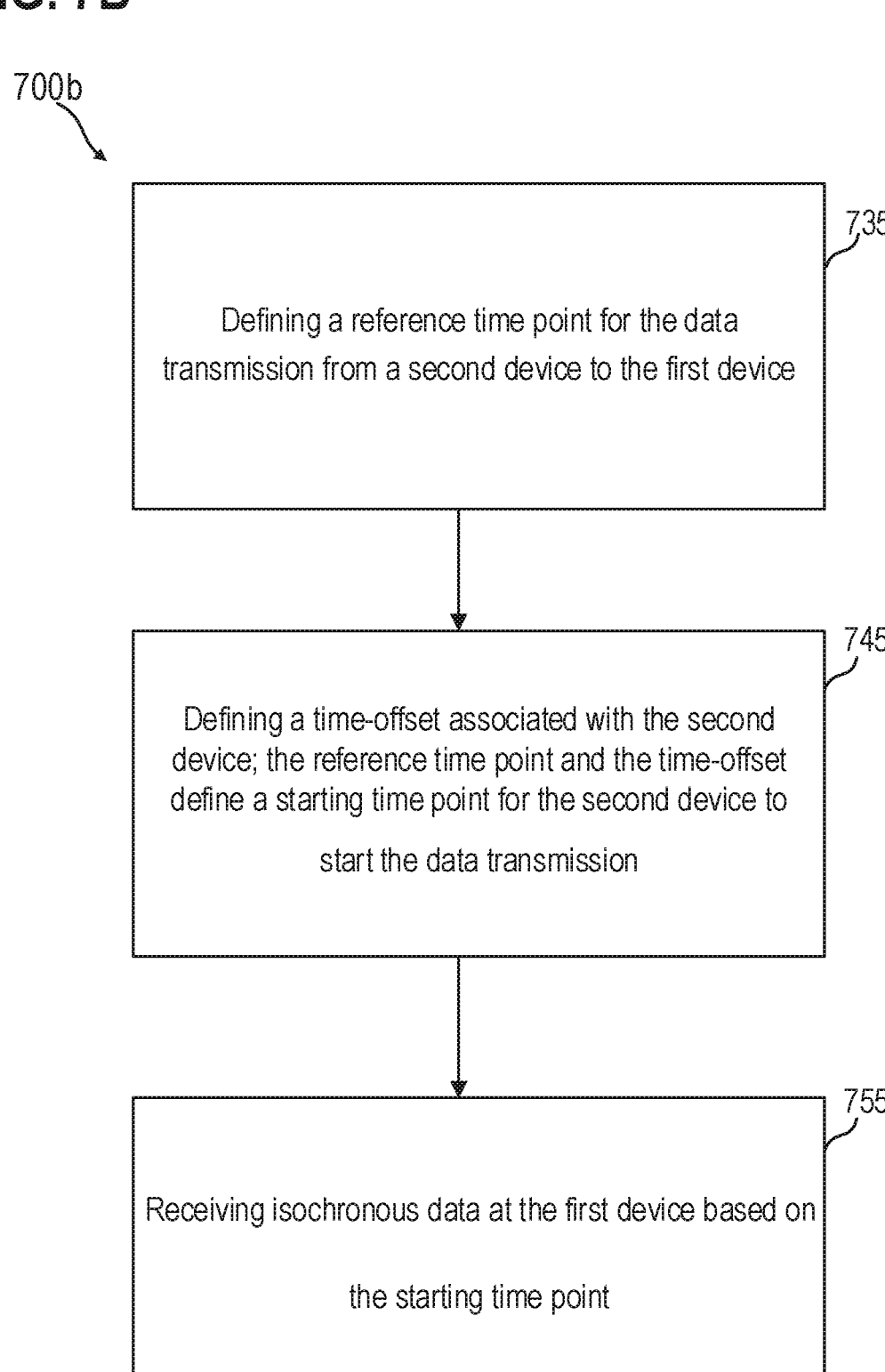

735

Defining a reference time point for the data transmission from a second device to the first device

745

Defining a time-offset associated with the second device; the reference time point and the time-offset define a starting time point for the second device to start the data transmission

755

Receiving isochronous data at the first device based on the starting time point

FIG. 7C

700c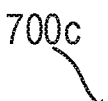

Receiving a reference time point for the data transmission from the second device to a first device

765

Receiving a time-offset associated with the second device; the reference time point and the time-offset define a starting time point for the second device to start the data transmission

775

Transmitting isochronous data to the first device based on the starting time point

785

BLUETOOTH REPORT EVENTS FOR ULTRA LOW LATENCY

TECHNICAL FIELD

The present disclosure relates generally to devices, systems, and methods to provide device-to-device communication with low latency, for example in the context of Bluetooth® Low Energy (BLE) communication.

BACKGROUND

In general, various technologies and standards have been developed for wireless communication, which is at the basis of a variety of services and applications in everyday life, such as the consumption of entertainment content via streaming services, the implementation of automated driving functionalities via exchange of information with a road infrastructure, or the design of Internet of Things environments in an industrial or in a home setting, as examples. A wireless communication protocol that is widely used for short-range communications is Bluetooth® (BT), which is a technology based on the use of radio frequencies to transmit and receive information over short distances. The fields of application of BT are numerous. For example, BT-technology may be used to stream audio data to wireless headphones, or to receive data from sensor devices. As another example, BT-technology may be used to pair a computer (e.g., a laptop) with other devices in its surrounding, such as a mouse, a keyboard, a printer, and the like. The development of advanced strategies for wireless communication, and in particular for BT-based communication, is thus of fundamental importance for a variety of applications in everyday life.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 3A to FIG. 3F each shows an exemplary time diagram of a communication among multiple devices, in a schematic representation according to the present disclosure;

FIG. 4A to FIG. 4F each shows an exemplary time diagram of a communication among multiple devices in BLE-technology, in a schematic representation according to the present disclosure;

FIG. 7A to FIG. 7C each shows an exemplary schematic flow diagram of a method of carrying out communication between a first device and a second device, according to the present disclosure.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects may be combined with one or more other aspects to form new aspects. Various aspects are described in connection with methods and various aspects are described in connection with devices (e.g., a device for use in a communication system, a central device, a peripheral device, etc.). However, it may be understood that aspects described in connection with methods may similarly apply to the devices, and vice versa.

With the advancements of new generations of devices capable of wireless communication, there is a constant demand for improvements in the overall performance of data transmission and reception, for example in terms of data throughput, latency, energy consumption, and the like. In this regard, Bluetooth® offers an advantageous alternative to other communication technologies (e.g., Wi-Fi or Near Field Communication (NFC)), in the context of small-area networks, for example for IoT environments. The BT-technology enables communication without the need for an internet connection, and provides a cost-efficient and energy-efficient solution for transferring data among devices that are located near to one another. With the 4.0 version of the Bluetooth® wireless networking standard, the so-called Bluetooth® Low Energy (BLE) was introduced (also referred to as Bluetooth® smart), which is an adapted communication protocol that consumes less power than the preceding Bluetooth® versions.

Figure 1:
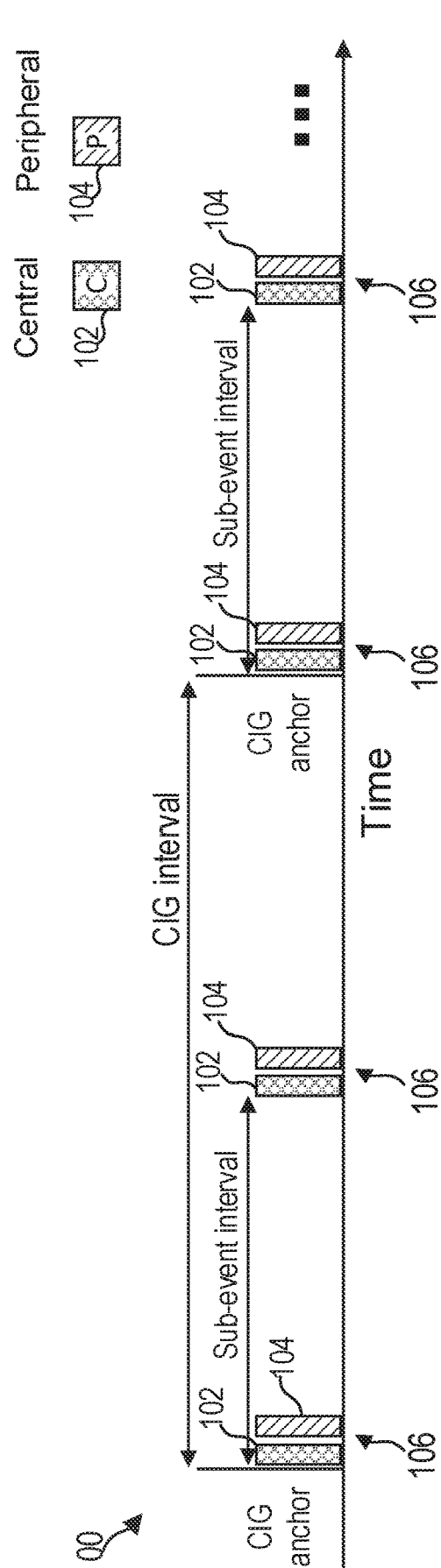
FIG. 1 shows an exemplary time diagram of a communication between a central device and a peripheral device in BLE-technology.

FIG. 1 shows a graph 100 illustrating an exemplary communication between a central device and a peripheral device according to a conventional approach in the context of Bluetooth® Low Energy communication. In general, communication according to the BLE standard is well known, some concepts are briefly discussed herein to introduce some aspects relevant for the communication strategy of the present disclosure.

In BLE there are two types of communication, namely broadcasting and connections. In (connectionless) broadcasting a BLE-device (referred to as broadcaster) may send data out to any BLE-device (referred to as observer) within the radio range. Connections, on the other hand, refer to the scenario in which data transmission occurs in both directions, that is "connections" refer to a periodical transmission/reception of data between two devices (rather than just one device broadcasting data). Both "broadcasting" and "connections" are governed by the Generic Access Profile (GAP) specification.

In BLE "connections", the devices involved in the communication assume different roles. In brief, a peripheral device transmits advertisement packets to allow other devices to discover and establish a connection with the peripheral device. A central device carries out scans of the available communication channels in search of advertisement packets, and in case the central device finds an advertisement packet that allows the establishment of a connection, the central device may connect with the peripheral device. After the establishment of the connection, the peripheral device assumes the role of a "slave device", and the central device assumes the role of a "master device". After the BLE-connection has been established, either device may assume the role of a "client" or a "server". The "client" (usually the central/master) may access resources present on the server, whereas the "server" (usually the peripheral/slave) provides the resources (e.g., data) to the client.

In a conventional approach, the communication between the client and the server takes place according to a "request-response" mechanism, as shown in FIG. 1. In an exemplary scenario, the central device is the arbiter of the connection and prompts the peripheral device to transmit data. The peripheral device transmits a data packet to the central device in response to a corresponding request packet. This type of communication, however, results in a constant overhead of empty packets which the central device sends, followed by an inter frame space, until the peripheral device responds back.

In BLE-connections, a data stream may be referred to as Connected Isochronous Stream (CIS), and each CIS may be grouped with other CISs in a Connected Isochronous Group (CIG) for synchronization purposes. A CIS may be understood as a logical transport that allows the central device and the peripheral device to transfer isochronous data. A common example is in audio-application, where one CIS is sent to the left earbud and another CIS is sent to the right earbud, and both CISs are part of the same CIG.

The central device may thus create a CIG, the CIG may include one or more CISs, and each CIS may contain multiple sub-events. As shown in FIG. 1, a CIS may be divided into one or more sub-events 106, i.e. one or more time slots for the central device and the peripheral device to exchange data packets 102, 104. Illustratively, in each sub-event 106, the central device sends a data packet 102 (to request data) to the peripheral device, and the peripheral device responds with a corresponding data packet 104 to the central device. Further illustratively, in each sub-event 106, the central transmits and the peripheral responds. Within a CIG there may be more than one CIG events, each with a corresponding CIG interval. Each CIG event may include one or more CIS events, depending on the number of CISs in the CIG. Each CIS event may occur at a regular interval, and may be partitioned into the one or more sub-events 106. A CIG event includes the corresponding CIS events of the CISs currently included in the CIG (for example, each CIS may be associated with a different peripheral, e.g. the left and right earbuds as an example). A CIG event starts at the CIG anchor point of the earliest (in transmission order) CIS of the CIG.

As an exemplary application, BLE enables a device such as personal computer (PC) to collect information from devices which capture movement or tracking position, and optional updates about button presses. For example, head tracking is measured as absolute coordinates of the head in a four-dimensional (4D) sphere. As a further example, mouse movements may be measured as relative displacement of X and Y coordinates, comparing to a previous report. Another example is tracking the position of a body sensor in an online game. Button presses may be considered an absolute state for a given duration of time.

The current transport in Bluetooth® between PC and a sensor relies on a point-to-point connection, in which the PC is the arbiter of the connection (illustratively, acting as central device); while the sensor can send data back to the PC only if the PC is addressing the sensor. The sensor is said to be in Peripheral role. The problem with such a transport is that for steady state flow of data from the sensor to the PC; there is a constant overhead of empty packets which the PC is required to send followed by an inter frame space, until the sensor peripheral can respond back. Currently, in Bluetooth® specification, the lowest report rate is 7.5 ms.

FIG. 1 shows an exemplary scenario of one CIG with one CIS having two sub-events 106. As shown, in each sub-event 106 the central sends a packet 102 to the peripheral. In applications such as audio, this makes sense since the central (for example a personal computer, PC) has audio to send to the peripheral. The present disclosure is based on the recognition that this approach is however inefficient for other types of applications. For example in applications where sensor data is arriving from the peripheral only, towards the central (e.g., towards the PC), the additional time, which the central (e.g., the PC) spends to send a packet, and then the inter frame spacing, is creating additional overhead which reduces the ability to send high rate, lower latency, absolute sensor report updates. Illustratively, in a conventional BLE-approach, CIS connections are used to solicit sensor reports by the central constantly polling. Such a CIS connection causes a waste of bandwidth, airtime, and power to solicit reports from sensor peripherals; thus, increasing latency and reducing maximum possible report rate. Many sensor applications are blocked due to inability to use low-energy (LE) transport efficiently.

The present disclosure is related to a communication protocol for enabling data transfer among devices (e.g., data transfer from a peripheral device to a central device) in a more time- and resource-efficient manner, e.g. compared to the current BLE-approach. The approach described herein is based on defining a starting time point for the data transmission uniquely associated with the device that should transmit the data (e.g., the peripheral device), and then carrying out transmission of isochronous data from the defined starting time point. The approach described herein is thus based on defining, a priori, the timing of the data transmission, thus overcoming the above-mentioned downsides of the conventional "request-response" approach. Illustratively, with the strategy described herein the device that receives the data (e.g., the central device) is aware of when to expect data from the other device, and the isochronous nature of the data ensures that the receiving device is also aware of the intervals at which the other device will transmit the data packets.

The strategy described herein thus eliminates the need for the device receiving the data to continuously address the other device to prompt the data transmission. Contrary to the conventional configuration described above, the approach described herein includes a "one-time" definition of the (timing) parameters of the data transmission, thus allowing the (peripheral) device to transmit data without having to wait for corresponding requests. The approach described herein is thus particularly suitable for low-latency or ultra-low-latency applications, in which the speed of the data transfer plays an important role for the overall performance of the system and/or for the user's experience. As an example, the approach described herein is particularly suitable for gaming applications, in which inputs from a user or the movement of the user may be received/tracked with ultra-low-latency.

The assignment of a unique starting point to a certain device for starting the data transmission enables a simple yet efficient management of a communication scenario with multiple (peripheral) devices. Each device may have a unique starting point for the respective data transmission, so that interferences may be avoided. Illustratively, the unique starting point in combination with the isochronous nature of the data allows predicting when a certain device will transmit a data packet, thus allowing scheduling the respective data transmissions to prevent overlap between different transmitting devices.

According to the present disclosure a device may include: a communication interface configured to communicatively couple the device with another device; and a processor configured to: define a reference time point for a data transmission from the other device to the device; define a time-offset associated with the other device; transmit the reference time point and the time-offset to the other device; and receive from the other device isochronous data via the communication interface; the reference time point and the time-offset define a starting time point for the other device to start transmitting the isochronous data.

According to the present disclosure a device may include: a communication interface configured to communicatively couple the device with another device; and a processor configured to: receive from the other device an isochronous sequence of data packets via the communication interface, and for each data packet of the sequence of data packets, refrain from transmitting a request signal to the other device for prompting the transmission of the data packet.

According to the present disclosure a peripheral device (illustratively, a communication device configured to operate as a peripheral device, e.g. in a communication system) may include: a communication interface configured to communicatively couple the peripheral device with another device; and a processor configured to: receive a reference time point for a data transmission from the peripheral device to the other device; receive a time-offset associated with the peripheral device; and transmit to the other device isochronous data via the communication interface; the reference time point and the time-offset define a starting time point for the peripheral device to start transmitting the isochronous data.

According to the present disclosure a peripheral device may include: a communication interface configured to communicatively couple the peripheral device with another device; and a processor configured to: transmit to the other device an isochronous sequence of data packets via the communication interface, and for each data packet of the sequence of data packets, transmit the data packet without waiting for a request signal from the other device prompting the transmission of the data packet.

According to the present disclosure a method of managing a data transmission from a second device to a first device may be provided, the method including: defining a reference time point for the data transmission from the second device to the first device; defining a time-offset associated with the second device; the reference time point and the time-offset define a starting time point for the second device to start the data transmission; and carrying out the data transmission from the second device to the first device in accordance with the starting time point; the data transmission includes transmitting isochronous data from the second device to the first device.

The approach proposed herein is particularly suitable, without limitation, for the transfer of sensor data from a peripheral device to another (e.g., central) device. In an exemplary configuration, the isochronous data transmitted from the peripheral device to the other device may thus be or include sensor data, for example pressure data from a mouse, or tracking data from a body/head movement tracker (e.g. coordinates in a 4D-sphere, for example coordinates of a head movement). Such exemplary configuration may be based on the recognition that in applications involving transmission of sensor data (e.g., from a sensor peripheral to a central processing device), the conventional "request-response" communication may cause an undesired and unnecessary latency, and thus a lower data rate, which is particularly detrimental for the user's experience in, for example, videogames (the so-called "lag").

According to the present disclosure, the device receiving the data may transmit an integrity signal representative of whether the reception of a batch of data packets was successful. The device receiving the data may transmit the integrity signal after the device transmitting the data has transmitted a predefined number of data packets, to indicate whether one or more of the data packets were incorrectly or incompletely received. The integrity signal may prompt the device transmitting the data to retransmit at least part of the data packets in case of an unsuccessful first transmission/reception. Compared to an approach in which the device receiving the data transmits a feedback signal after each data packet, the strategy described herein with an integrity signal for a group of data packets reduces the overhead, and thus the overall latency of the data transmission.

The transmission of the integrity signal may be particularly advantageous in case the isochronous data are or include sensor data representative of relative measurements, e.g. in case the senor data are representative of a relative variation of a value of a physical quantity with respect to a previous value of the physical quantity (e.g., a pressure value, a position, etc.). In case of relative measurements, a missing data point may negatively influence the interpretation of the data (e.g., causing a "jump" in the tracking of a movement, as an example). In this scenario it may thus be beneficial to determine the integrity of the received data, and prompt the retransmission of missing or corrupted data packets.

In the present disclosure, particular focus is given to short-range wireless communication. In the following, particular reference is made to the case in which the devices involved in the communication (e.g., the central device and the peripheral device) are configured for short-range wireless communication, e.g. are configured for Bluetooth® communication (in particular for BLE communication), which may be the most relevant use case for the strategy described herein. However, the approach described herein is not limited to (short-range) wireless communication, and may in general be applicable to other types of communication technologies. In general, the approach described herein may be provided in communication scenarios involving a device having a "master role" and a device having a "slave role". As another example, the approach described herein may be applied in wired-communication in the so-called 1-Wire communication, in which a master device and a slave device communicate with one another via a single wire.

Furthermore, the present disclosure makes particular reference to the scenario in which the device transmitting the (isochronous) data is a "peripheral device", as this may be the most relevant use case for the strategy described herein, e.g. to provide data with low latency in case of a sensor peripheral. It is however understood that the communication strategy described herein may in general be applied to communication between devices (e.g., between a first device and a second device), without the need for the device transmitting the data to be a "peripheral device".

FIG. 2A shows an exemplary communication system 200 including a first device 202 and a second device 204, in a schematic representation according to the present disclosure. In an exemplary configuration, the communication system 200 may be a wireless communication network, such as a personal area network or a local area network. As an example, the communication system 200 may be a Bluetooth® network (illustratively, a piconet), in particular a Bluetooth® Low Energy network. It is understood that the representation of the communication system 200 and of the devices 202, 204 may be simplified for the purpose of illustration. It is also understood that the communication system 200 may include more than two devices 202, 204, e.g. the communication strategy described herein may apply to a scenario with more than two devices, as discussed in further detail below. In general, the first device 202 and the second device 204 may be capable of exchange information with other devices, e.g. with one another, for example according to various types of radio communication technologies and using various types of communication protocols, e.g. the first device 202 and the second device 204 may be communication devices (e.g., configured for wireless communication).

The first device 202 and the second device 204 may include a processor 206, 208 configured to control an operation of the device 202, 204 (e.g., configured to control or to cause a communication between the first device 202 and the second device 204). The first device 202 and the second device 204 may include a communication interface 210, 212, and the first device 202 and the second device 204 may be communicatively coupled with each other via the respective communication interface 210, 212. It is understood that the first device and the second device 204 may include additional components with respect to those shown, for example a memory configured to store instructions that may be executed by the processor 206, 208 (e.g., a read-only memory storing firmware), e.g. instructions to cause the processor 206, 208 to carry out the communication strategy described herein.

The first device 202 and the second device 204 (e.g., the respective first processor 206 and second processor 208) may be configured to carry out the adapted communication strategy according to the present disclosure. In general, the first device 202 and the second device 204 may be configured to define the timing parameters for a data transmission one-time prior to the data transmission, so that further interactions during the data transmission may be dispensed with.

The first processor 206 may be configured to determine (e.g., define) a reference time point 214 for the data transmission between the first device 202 and the second device 204, e.g. for a data transmission from the second device 204 to the first device 202. Illustratively, the first processor 206 may be configured to establish or set a moment in time for the data transfer. The first processor 206 may be further configured to determine (e.g., define) a time-offset 216 associated with the second device 204. Illustratively the first processor 206 may be configured to assign a time-offset 216 to the second device 204 for the data transmission. The first processor 206 may thus be configured to specify and associate a time delay for the data transmission with the second device 204.

The time-offset 216 may be uniquely associated with the second device 204. In general, the first device 202 may be capable of communicating with more than one further device, e.g. at the same time (illustratively over a same time period). The first processor 206 may thus be configured to define a unique time-offset 216 for each device with which the first device 202 may have a data transmission (see also FIG. 3C). The first processor 206 may thus be configured to assign a distinct time-offset 216 to each device with which the first device 202 may communicate over a certain time period.

The first processor 206 may be further configured to inform the second device 204 (e.g., the second processor 208) of the timing parameters of the data transmission. The first processor 206 may be configured to transmit (e.g., to control or cause a transmission of) the reference time point 214 and the time-offset 216 to the second device 204. In a corresponding manner, the second processor 208 may be configured to receive the reference time point 214 and the time-offset 216 defined by the first device 204.

The first device 202 and the second device 204 may be configured to carry out the data transmission according to the defined timing parameters, illustratively based on the (pre-)defined reference time point 214 and time-offset 216. The second device 204 may be configured to transmit data to the first device 202 according to the timing parameters. In this regard, the second processor 208 may be configured to transmit (e.g., control or cause the transmission of) isochronous data 218 to the first device 202 via the (second) communication interface 212. In a corresponding manner, the first processor 206 may be configured to receive the isochronous data 218 from the second device 204 via the (second) communication interface 210. Illustratively, the data transmission may include the second device 204 carrying out an isochronous transfer of data 218 to the first device 202 in accordance with the reference time point 214 and time-offset 216.

The reference time point 214 and the time-offset 216 may define a starting time point for the second device 204 to start transmitting the isochronous data 218 (see also FIG. 3A). The reference time point 214 and the time-offset 216 may determine the beginning of the transmission of the isochronous 218 from the second device 204 to the first device 202 (e.g., the beginning of the transmission of a first data packet 220-1 included in the isochronous data 218). The second processor 208 may thus be configured to initiate the transmission of the isochronous data 218 to the first device 202 at the initial time point indicated by the reference time point 214 and the time-offset 216.

The isochronous data 218 may include a plurality of data packets 220-1, 220-2, 220-3 spaced at isochronous time intervals with respect to one another. The isochronous data 218 may thus be or include an isochronous data stream with a plurality of data packets 220-1, 220-2, 220-3 spaced in time by a same time period (or by a multiple of a predefined time period). During the data transmission, the second processor 208 may thus be configured to transmit data packets 220-1, 220-2, 220-3 at a regular (uniform) rate, illustratively may be configured to transmit data packets 220-1, 220-2, 220-3 with isochronous timing. The isochronous time interval may be known to the first processor 206, e.g. the isochronous time interval may be a predefined parameter of the second device 204 (or of the communication system 200), or there may be an exchange of information prior to the data transmission in which the second processor 208 transmits the isochronous time interval to the first device 202.

The data 218 may thus include data packets 220-1, 220-2, 220-3 periodically spaced (illustratively, regularly spaced) in time, and the time period between consecutive data packets may be predefined (e.g., known) to the device receiving the data 218 (e.g., may be known to the first device 202). Illustratively, the transmission of isochronous data 218 may include a periodic transfer of data from the second device 204 to the first device 202 with a predefined transmission period.

Compared for example to the BLE-approach discussed in relation to FIG. 1, in which a central constantly sends packets to allow the peripheral to send data back, the adapted approach described in FIG. 2A eliminates the overhead of the continuous requests, thus allowing a communication with low latency. In the BLE-approach, for point-to-point or point-to-multi point communication, the central is the arbiter, defining access to the communication channel, since the peripherals would otherwise not be aware of when the channel is free. In contrast thereto, the approach described herein may be understood as an a priori "passive" arbitration, in which the devices involved in the data transmission define (e.g., negotiate) the timing parameters once, and then may carry out the data transmission without further interactions. In this regard, the definition of the starting time-point together with the isochronous characteristic of the data transfer provide that the timing of all the relevant events is known prior to initiating the transmission, so that a precise and reliable scheduling is provided. Illustratively, the isochronicity provides a deterministic approach.

In an exemplary configuration, the first processor 206 may be configured to enter into a receive-only mode for the duration of the data transmission, illustratively for the duration of the second device 204 transmitting the isochronous data 218 to the first device 202. In a corresponding manner, the second processor 208 may be configured to enter into a transmit-only mode for the duration of the data transmission. Illustratively, the first processor 206 may be configured to cause the first device 202 to enter into a receive-only mode for the duration of the data transmission, and the second processor 208 may be configured to cause the second device 204 to enter into a transmit-only mode for the duration of the data transmission. The first processor 206 may thus be configured to refrain from transmitting any signal (e.g., any data packet) to the second device 204 while the second device 204 is transmitting the isochronous data 218 (e.g., while the second device 204 is transmitting a first batch, e.g. a first sequence, of data packets). In a corresponding manner, the second processor 208 may be configured to transmit the isochronous data 218 (illustratively, each data packet, e.g. each data packet within a first sequence) without any further input from the first device 202 during the data transmission, illustratively without waiting for a signal from the first device 202 prompting the transmission of a data packet.

In an exemplary configuration, a device other than the first device 202 may carry out the operation of defining the reference time point 214 and the time-offset 216, and may transmit the reference time point 214 and the time-offset 216 to both the first device 202 and the second device 204. Illustratively, in such exemplary configuration a communication manager external to the first device 202 and to the second device 204 may be configured to determine (e.g., define) the timing parameters for the data transmission from the second device 204 to the first device 202. This approach may provide reducing the processing load on the first device 202, and implement the scheduling of the communication in a more centralized manner.

The reference time point 214 and the time-offset 216 may assume any suitable form, e.g. may be expressed in terms of absolute time, seconds, milliseconds, clock cycles, etc. In the context of BLE, as discussed in further detail below, the reference time point 214 may be an anchor point, e.g. a CIG anchor. In general, the reference time point 214 and the time-offset 216 may be indicative of a single time value, e.g. a single instant in case of the reference time point 214 or a single time delay in case of the time-offset 216. In an exemplary configuration, however, the first processor 206 may be configured to define a reference time range, e.g. a range of possible reference time points 214 for the data transmission. In a similar manner, the first processor 206 may be configured to define a time-offset range, e.g. a range of possible (unique) time-offsets 216 associated with the second device 204. In this configuration, the starting time point for the data transmission may be defined by any suitable combination of a reference time point 214 in the reference time range with a time-offset 216 in the time-offset range.

The first device 202 and the second device 204 may be communicatively coupled with one another via the respective communication interfaces 210, 212. Illustratively, the communication interfaces 210, 212 may provide (e.g., define) a communication channel 222 (or a plurality of communication channels) via which the communication between the first device 202 and the second device 204 may occur. The communication channel(s) may thus be or include a connection (e.g., a control signaling connection) between the first device 202 and the second device 204. Illustratively, the first device 202 and the second device 204 may establish a communication link 222 between one another, and may exchange information via the established communication link 222. For example, e.g. in the BLE-context, the communication channel 222 may be a physical link formed between the first device 202 and the second device 204, and may be used as a transport for one or more logical links between the first device 202 and the second device 204. In an exemplary scenario, the communication link 222 may include one or more frequency ranges within one or more frequency bands (e.g., within the 2.4 GHz band and/or the 5 GHz band), e.g. each frequency range corresponding to a respective communication channel.

A communication interface 210, 212 may thus be configured to communicatively couple the respective device 202, 204 with another device 202, 204. A communication interface 210, 212 may thus include one or more components configured to allow connecting the respective device 202, 204 with another device 202, 204 (or with more other devices) for communication purposes. Illustratively, a communication interface 210, 212 may be configured to allow the respective device 202, 204 to communicate with other devices, e.g. may be configured to allow the respective device 202, 204 to transmit and/or receive data (illustratively, signals encoding data) with other devices (illustratively, other devices external to the respective device 202, 204).

In general, the configuration of a communication interface 210, 212 may be adapted according to a desired technology for the device-to-device communication. As an exemplary configuration, e.g. for wireless communication (e.g., in the BT/BLE context), a communication interface 210, 212 may include one or more antennas to radiate and/or receive radio waves. In this scenario, a communication interface 210, 212 may include one or more electrical components for analog and/or digital signal processing for transmission and/or reception of the radio waves, such as one or more of: a low-noise amplifier, a power amplifier, a frequency filter (e.g., a bandpass filter, a low-pass filter), a local oscillator, an impedance matching circuit, an analog-to-digital converter, a digital-to-analog converter, and/or the like.

As another exemplary configuration, e.g. for light-based communication, a communication interface 210, 212 may include one or more light sources to emit (encoded) light signals and/or one or more detectors (e.g., one or more photo diodes) to detect light signals. As a further exemplary configuration, e.g. for sound-based communication, a communication interface 210, 212 may include one or more vibrating elements (e.g., one or more membranes) to emit sound waves and/or to receive sound waves (illustratively, one or more transducers to convert sound waves into analog signals, such as a current or a voltage). As a further exemplary configuration, e.g. for wired-based communication, a communication interface 210, 212 may include one or more components (e.g., one or more resistors, one or more capacitors, and the like) to control a signal level of a voltage at the communication interface 210, 212 to control a current traveling along the wired-connection.

In an exemplary scenario, e.g. in the BLE-context, the second processor 208 may be configured to transmit one or more advertisement packets over the BLE-communication channels (e.g., over the three primary advertising channels). The first processor 206 may be configured to scan available communication channels (e.g., the three primary advertising channels) to search for advertisement packets and, upon finding one or more of the advertisement packets that the second device 204 transmitted, establish a communication link with the second device 204.

In an exemplary configuration, the second device 204 (illustratively, the device transmitting the isochronous data) may be a peripheral device (e.g., a sensor peripheral), e.g. may be a device configured to carry out an auxiliary function within the system 200. Illustratively, the second device 204 may be a communication device configured to operate as a peripheral device. The second device 204 may be configured to operate as a "secondary device" in the communication system 200. For example, the second device 204 may be battery-powered (illustratively, may include a battery as energy source). In general, a peripheral device may be a low-complexity, low-power consumption, low-processing power device configured to carry out a simple function. As examples for which the communication strategy described herein is particularly suitable, a peripheral device may include an input device, such as a keyboard, a mouse, a joypad, a joystick, a gaming controller and the like, or a (e.g., battery-powered) movement tracker, such as a wearable tracking device (e.g., a head tracking device or a body tracking device). In an exemplary configuration, the device transmitting the isochronous data 218 (the second device 204) may have a lower processing power with respect to the device receiving the isochronous data 218 (the first device 202).

In general, the communication strategy described herein may be particularly advantageous for peripheral devices configured to record many events in rapid succession (illustratively, a sequence of input events at short time intervals from one another). For example, a peripheral device may be configured to record more than 10 events per second, or more than 100 events per second, as numerical examples. It is however understood that a peripheral device may also include other types of input devices, configured to operate on longer time scales, such as a microphone, a USB key, a speaker, a heart monitor, a fitness tracker, and the like.

In an exemplary configuration, the isochronous data 218 may be or may include sensor data, e.g. may include data representative of a physical quantity, such as a pressure, a distance, a velocity, an acceleration, a luminosity, a noise level, and the like. As examples for which the communication strategy described herein is particularly suitable (e.g., considering the exemplary types of peripheral devices mentioned above), the sensor data may include tracking data, acceleration data, velocity data, pressure data (e.g., indicative of a button being pressed, for example in a mouse, keyboard, joypad, etc.), and/or a combination thereof. For this types of sensor data the low latency provided by the strategy described herein may be particularly relevant. The sensor data may thus be representative of one or more properties of the movement of an object (e.g., of a person wearing a tracker) and/or may be representative of a command (e.g., in case a user is pressing a certain button in a joypad, for example). Illustratively, the sensor data may be representative of an action of a user, for example in the context of a videogame. It is however understood that the communication strategy described herein may also apply to other types of data, e.g. other types of sensor data (e.g., temperature, humidity, etc.). In an exemplary configuration, the second device 204 may thus include one or more sensors (e.g., one or more pressure sensors, velocity sensors, acceleration sensors, light sensors, and/or the like) configured to record (e.g., to detect) events and generate corresponding sensor data, and the second processor 208 may be configured to transmit the sensor data (as isochronous data 218) to the first device 202.

The sensor data may include absolute sensor data and/or relative sensor data. Illustratively, the sensor data may be representative of an absolute value of a physical quantity, for example an absolute position (e.g., absolute coordinates in a space, for example in a 4D-sphere), an absolute pressure, an absolute velocity, and the like. Additionally or alternatively, the sensor data may be representative of a relative variation of a value of the physical quantity with respect to a previous value of the physical quantity (or with respect to a reference value, or initial value, of the physical quantity). Illustratively, the sensor data may be representative of a change of the physical quantity relative to the value that the physical quantity had at a previous time point. This may be the case, for example, for mouse coordinates, which may be expressed in terms of a relative variation with respect to the previous position of the mouse pointer. In the context of tracking data, the sensor data may thus include absolute coordinates representative of a position of an object (e.g., of a body part), and/or relative coordinates representative of a variation in a position of the object with respect to a previous position of the object.

Considering the transmission of data packets 220-1, 220-2, 220-3, each data packet may include or may be representative of an absolute value of the physical quantity (e.g., of one or more absolute values). As another example, each data packet may include or may be representative of a relative variation of the value of the physical quantity with respect to the preceding data packet, for example the preceding data packet in a sequence of data packets.

In an exemplary configuration, the first device 202 and the second device 204 may be configured to communicate with one another according to a wireless communication protocol, e.g. a short-range wireless communications protocol. Illustratively, the first communication interface 210 and the second communication interface 212 may be wireless communication interfaces, e.g. the communication channel 222 between the first device 202 and the second device 204 may be a wireless communication channel.

As an example, the short-range wireless communications protocol may be a Bluetooth® communications protocol, e.g. a BLE communications protocol. Illustratively, the first device 202 and the second device 204 may be configured to communicate with one another according to a Bluetooth® wireless technology standard (e.g., according to the Bluetooth Core Specification v5.3, revision date Jul. 13, 2021 prepared by the Core Specification Working Group, or according to any other suitable Bluetooth® specification), for example according to Bluetooth® Low Energy technology. The first device 202 and the second device 204 may thus be or be configured as Bluetooth® devices, e.g. Bluetooth® Low Energy devices (for example, the first device 202 may be a central device for use in a BLE-network, and the second device 204 may be a peripheral device for use in a BLE-network).

In this scenario, the first communication interface 210 and the second communication interface 212 may be Bluetooth® communication interfaces, e.g. BLE communication interfaces, and the communication channel 222 between the first device 202 and the second device 204 may be a Bluetooth® (e.g., BLE) communication channel. For example, the first device 202 and the second device 204 may be configured to communicate with one another in the 2.4 GHz ISM (Industrial, Scientific, and Medical) frequency band. Considering a BLE-configuration, the first device 202 and the second device 204 may be configured to communicate with one another over forty communication channels (with a center-to-center separation in frequency of 2 MHz) in the radio frequency spectrum, e.g. three primary advertisement channels and thirty-seven secondary advertisement channels.

Bluetooth® technology may use frequencies between 2.402 GHz and 2.480 GHz, or 2.400 GHz and 2.4835 GHz including guard bands 2 MHz wide at the bottom end and 3.5 MHz wide at the top, according to frequency-hopping spread spectrum. A communication device operating according to a Bluetooth protocol may divide data to be transmitted into packets, and transmit each packet into a channel designated for the use (e.g. of bandwidth of 1 MHz for classic Bluetooth® and 2 MHz for Bluetooth® Low Energy). A communication device configured to operate according to a Bluetooth protocol may operate in a basic rate (BR) mode using a Gaussian frequency-shift keying (GFSK) modulation, and/or operate in an enhanced data rate (EDR) mode, that is considered to provide a faster data rate and lower power consumption, using a differential phase-shift keying (DPSK) (e.g., 8-DPSK) and/or differential quadrature phase-shift keying (DQPSK) (e.g., $\pi$/4-DQPSK) based on the quality of the communication channel. A communication device configured to operate according to a Bluetooth protocol may operate according to the Bluetooth Low Energy (BLE) technology, which operates within the same frequency spectrum, using GFSK modulation.

In an exemplary configuration, for example in the context of BLE-technology, the first device 202 (illustratively, the device receiving the isochronous data) may be a central device, e.g. a device configured to carry out one or more primary functions within the communication system 200. Illustratively, the first device 202 may be a communication device configured as a central device, e.g. in a communication system 200. In general, the first device 202 may be configured to carry out a central processing function in the communication system. For example, the first device 202 may have a greater processing power than the second device 204 (and, as additional or alternative examples, a greater memory storage, a greater energy consumption, and/or the like). The first device 202 may thus be a "primary device" in the communication system 200. The central device may receive the isochronous data and may be configured to process and/or store the data to carry out more complex functions, such as analyzing and displaying information to a user, controlling a character in a videogame, etc. As an example, considering a gaming scenario, the central device may receive tracking data from a body/head tracking device and use the tracking data to control and show the movement of a character in a videogame. As another example, the central device may receive pressure data representative of a user pressing a button (e.g., of a mouse, keyboard, gaming controller, etc.) and use the data to control or visualize a corresponding action. In general, a central device may have more processing power and memory compared to a peripheral device, any may carry out more complex functions. As an example, a central device may be or may include a personal computer (PC), a laptop, a smartphone, a gaming console, and the like.

It is however understood that even in the context of BLE, the approach described herein is not limited to transfer of data from a peripheral device to a central device. This may be the most relevant use case, for example in case of sensor peripherals, but in general the strategy including the reference time point 214, time-offset 216, and isochronous data 218 may apply also to communication between/among two (or more) central devices, two (or more) peripheral devices, or to a transfer of data from a central device to a peripheral device.

Various possible configurations of the data transmission according to the strategy proposed herein will be described in relation to FIG. 3A to FIG. 3F.

FIG. 3A to FIG. 3F each shows a respective graph 300a, 300b, 300c, 300d, 300e, 300f illustrating a communication among multiple devices, according to the present disclosure. Illustratively, the graphs 300a, 300b, 300c, 300d, 300e, 300f show a transmission of isochronous data 302 in accordance with a reference time point 304 and a time-offset 306 (e.g., configured as the isochronous data 218, reference time point 214, and time-offset 216 described in relation to FIG. 2). The various features described in relation to FIG. 3A to FIG. 3F may thus apply to the communication between the first device 202 and the second device 204 described in relation to FIG. 2.

As shown in the graph 300a in FIG. 3A, the reference time point 304 and the time-offset 306 define the starting time point 308 for the transmission of the isochronous data 302. Illustratively, the time-offset 306 may be a shift or a delay with respect to the reference time point at which the second device (e.g., the second processor) may initiate transmitting the isochronous data 302 (e.g., may initiate transmitting a first data packet 310-1). The second processor may thus be configured to start sending the isochronous data 302 at a starting time point 308 after an interval corresponding to the time-offset 306 from the reference time point 304.

As shown in the graph 300a in FIG. 3A, the isochronous data 302 may include a plurality of data packets 310, e.g. an isochronous sequence of data packets 310. In the exemplary representation in FIG. 3A the isochronous data may include first to fourth data packets 310-1, 310-2, 310-3, 310-4, but it is understood that the isochronous data 302 may include any suitable number of data packets, e.g. adapted according to a desired application. In general, a data packet for the isochronous transmission may assume any suitable form known in the art. An exemplary configuration will be discussed in further detail in relation to FIG. 6C.

Figure 2:
FIG. 2 shows an exemplary communication system including a first device and a second device communicating with one another, in a schematic representation according to the present disclosure.

As discussed in relation to FIG. 2, the data packets 310 may be spaced at isochronous time intervals with respect to one another. The isochronous time interval may remain constant during the entire communication between the first device and the second device, or, in another configuration, different sequences of data packets may have different isochronous intervals. The duration of the isochronous interval may be freely selected according to the desired application (e.g., a user may select the isochronous interval, or the first device may indicate a desired isochronous interval for the data transmission, as examples).

The data transmission may occur without any request-response type of interaction between the first device and the second device. For each data packet 310, the first processor may be configured to refrain from transmitting a request signal to the second device for prompting the transmission of the data packet 310. Illustratively, the first processor may be configured to avoid sending a data packet (a request packet) to the second device for inviting the second device to respond thereto with a corresponding data packet 310. The first processor may thus be configured to wait for the second device to transmit the isochronous data 302 without transmitting any request signal during the transmission.

In a corresponding manner, the second device (e.g., the second processor) may be configured to transmit each data packet 310 without waiting for a request signal from the first device. The second processor may thus be configured to transmit all the data packets 310 of the isochronous data 302 (e.g., a predefined number of data packets, for example a sequence of data packets) without receiving any request signal from the first device, e.g. without receiving any request signal prompting the transmission of a data packet 310. Illustratively, the second processor may be configured to refrain from waiting for a request signal (or in general for data packets) from the first device during the transmission of the isochronous data 302.

In an exemplary configuration, the first processor may be configured to refrain from transmitting a feedback signal to the second device for each data packet 310 of the isochronous data 302. The feedback signal may be, for example, an acknowledgment signal or a negative acknowledgment signal. According to the strategy described herein, the (first) device receiving the data may refrain from acknowledging the reception of each data packet (and rather provide a "batch processing" as described in relation to FIG. 3D and FIG. 3E). Illustratively, the first processor may be configured to refrain from transmitting individual acknowledgement/negative acknowledgement signals for each data packet 310. This configuration may further reduce the overall latency of the data transmission.

In a corresponding manner, the second processor may be configured to transmit each data packet 310 without waiting for a feedback signal from the first device. The second processor may thus be configured to refrain from waiting for individual acknowledgement/negative acknowledgement signals for the data packets 310, and carry out the transmission of the data packets 310 (e.g., of all data packets within a sequence) independently of such individual acknowledgement/negative acknowledgement signals.

In an exemplary configuration, the reference time point 304 may be associated with the data transmission from the second device to the first device and, in addition, with one or more further data transmissions from one or more further (secondary, e.g. peripheral) devices to the first device. The data transmission from the second device to the first device and the one or more further data transmissions may be in a predefined relationship with one another, e.g. may be synchronized with one another. The data transmission from the second device to the first device and the one or more further data transmissions may be of the same type (e.g., may all be configured in a same manner) or may be different types of data transmission. As an example, considering the BLE-context, the data transmission from the second device to the first device may be configured as described herein, and a further data transmission may be configured according to the CIS-approach described above. As an example, at least one of the further data transmissions may include audio data. The strategy described herein may thus provide an efficient and reproducible manner to schedule various types of data transfer in a communication system. Illustratively, the first device may establish a plurality of communication links with a plurality of other devices (e.g., a plurality of secondary devices, e.g. a plurality of peripherals), and may be configured to synchronize the communication with the plurality of other devices.

According to the present disclosure, as shown in the graph 300b in FIG. 3B, the time-offset 306 may include a plurality of components, e.g. a plurality of time-offsets. In an exemplary configuration, the time-offset 306 may include a first time-offset 306-1 and a second time-offset 306-2. The first time-offset 306-1 may define, with respect to the reference time point 304 an initial time point of a data transmission interval 312 for the data transmission. The second time-offset 306-2 may define, with respect to the initial time point of the data transmission interval, the starting time point 308 for the second device to start transmitting the isochronous data 302. The first device may use the first time-offset 306-1 as a scheduling tool to define a further reference time point for the second device, e.g. at an offset with respect to the reference time point 304, which may provide organizing communication with a plurality of devices in a simple yet efficient manner. Illustratively, in a multi-device context, the first time-offset 306-1 may be or may define an initial time point for the data transmission from the second device to the first device and for one or more further data transmissions from one or more further devices (that may be carried out according to the approach described herein, or according to other configurations, see also FIG. 4A to FIG. 4F). The second time-offset 306-2 may be the portion of the time-offset 306 uniquely assigned to the second device, so as to define a unique starting time point 308 for the data transmission from that device.

The graph 300c in FIG. 3C illustrates the scenario with the first device receiving isochronous data from more than one device (e.g. more than one sensor peripheral). In this scenario, the first processor (or, in another configuration, the communication manager) may be configured to define a further time-offset 306b associated with a further device, e.g. a third device, for example a further peripheral device. In general, the first processor may be configured to define a plurality of time-offsets, one for each device from which the first processor may receive data. The reference time point 304 and the further time-offset 306b may define a further starting time point 308b for the third device to start transmitting further isochronous data 302b. Illustratively, the first processor may be configured to transmit the (same) reference time point 304 and the further time-offset 306b to the third device, and receive isochronous data from the third device via the respective communication interface (e.g., over a respective communication channel). As an example, the third device may be a further Bluetooth® device, e.g. a further BLE device, e.g. a further sensor peripheral. The further time-offset 306b may be uniquely associated with the third device. Illustratively, the time-offset 306 may be different from the further time-offset 306b.

In an exemplary configuration, the further time-offset 306b may include a (further) first time-offset and a second time-offset, as discussed for the time-offset 306 in FIG. 3B. The first time-offset may define the initial time point of a data transmission interval 312 for the data transmission from the third device, and the second time-offset may define the starting point for the third device to start transmitting the further isochronous data 302*b* with respect to the initial time point. The first time-offset 306-1 and the further first time-offset may be equal to one another. Illustratively, the first device may be configured to define a same initial time point for both the second and third device, to provide a synchronization between the data transmissions. This may be beneficial, for example, in case the isochronous data from the two devices are somehow interrelated (e.g., data from a head tracking device in combination with data from a mouse in the context of a videogame as an example). In this case, the second time-offset 306-2 and the further second time-offset may be different to one another, to avoid an overlap between the transmission of the isochronous data 302, 302*b* from the two devices.

The first processor may be configured to schedule the data transmission from the other devices in such a way that the transmitted data do not interfere. In this regard, the first processor may be configured to define (e.g., to select) the time-offset 306 and the further time-offset 306*b* in such a way that the isochronous data 302 and the further isochronous data 302*b* do not interfere with one another, e.g. in such a way that the data packets 310 and the further data packets 310*b* do not overlap (in time) with each other. Illustratively, the first processor may be configured to assign a respective unique time-offset 306, 306*b* to the second device and the third device (and, in general, to any further device, e.g. any further peripheral) in such a way that the second device transmits a data packet 310 only when the third device is not transmitting a respective data packet 310*b*, and vice versa. The isochronicity of the data contributes to this precise scheduling.

As an example, as shown in FIG. 3C, the first processor may be configured to define the time-offset 306 and the further time-offset 306*b* in such a way that the data packets 310 are interleaved with the further data packets 310*b*. This configuration may provide an efficient use of the available time interval, e.g. using the "silent" moments of one device to transmit/receive data from another device. It is however understood that the configuration with "interleaved" data packets is exemplary, and other scheduling options may be provided. It is also understood that the concepts described in relation to FIG. 3C may extend to the case with even a further (e.g., fourth) device, for which the first processor may be configured to define a corresponding time-offset, etc.

Figure 3D:
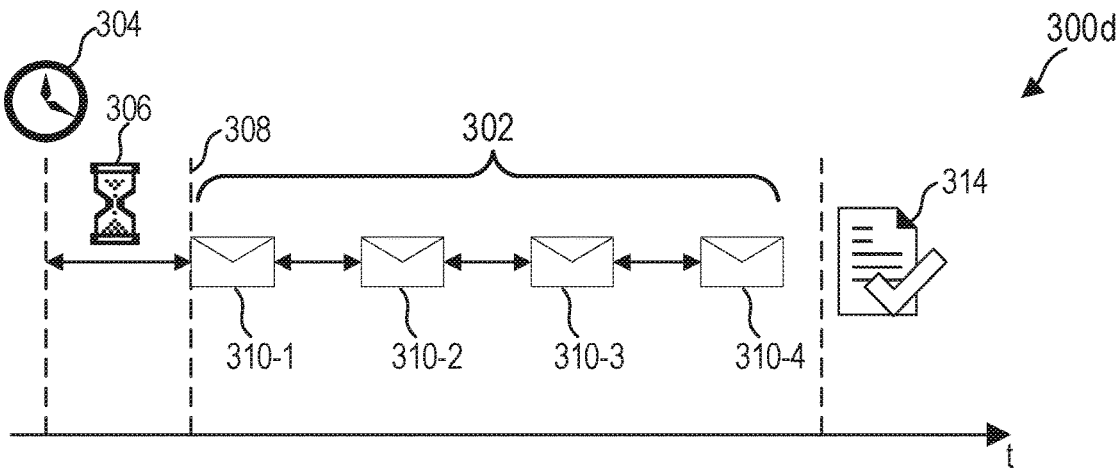

According to the present disclosure, as shown in the graph 300*d* in FIG. 3D, the (first) device receiving the data may be configured to indicate to the (second) device transmitting the data whether a batch of data packets has been correctly received. Illustratively, rather than individually acknowledging the reception of the individual data packets 310, the first processor may be configured to provide (e.g., to generate) a signal representative of the correct (or incorrect) reception of a plurality of data packets 310. This approach may contribute to reduce the overall latency of the communication, by combining together the otherwise individual indications.

The first processor may thus be configured to transmit an integrity signal 314 to the second device after a transmission from the second device of a predefined number of data packets 310. The first processor may be configured to send the integrity signal at a predefined time point after the starting time point 308 of the data transmission, e.g. based on a known duration of the data packets 310 and a known number of data packets 310. For example, the first processor may be configured to transmit the integrity signal 314 after the second device has transmitted a (full) sequence of data packets 310. In a corresponding manner, the second processor may be configured to receive the integrity signal 314 from the first device after the transmission of the predefined number of data packets 310, e.g. after transmission of a full sequence of data packets 310. The predefined number of data packets may be selected according to the type of applications, e.g. a lower number of data packets 310 to be checked may be selected in case of information with a finer granularity (for example in case of mouse coordinates), and a greater number of data packets may be selected in case of information with a coarser granularity. In an exemplary configuration, the integrity signal 314 may be or may include a reliability signal indicative of a reliability of the data packets 310 received at the first device.

The integrity signal 314 may be representative of a reception at the first device of the transmitted data packets 310 (illustratively, of the data packets 310 in the predefined number of data packets 310). The integrity signal 314 may thus be representative of an integrity level for each received data packet 310, e.g. the integrity signal 314 may be representative of a checksum of the data packets 310. Stated differently, the integrity signal 314 may be representative of an error level associated with the reception of the data packets 310 at the first device. As an example, the integrity signal 314 may be or may include a combination of a plurality of acknowledgment and/or negative acknowledgment signals (e.g., one for each data packet 310). The integrity signal 314 may be, for example, a block acknowledgment for a block of data packets 310.

Figure 3E:
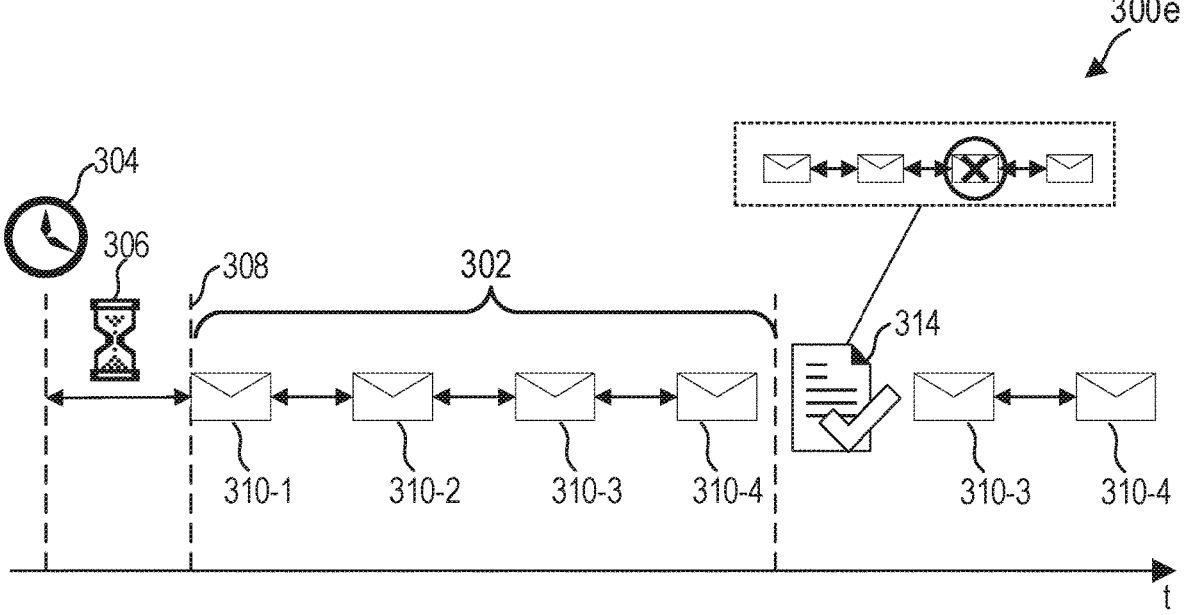

As shown in the graph 300*e* in FIG. 3E, the integrity signal 314 may induce (in other words, cause) a retransmission of one or more of the already transmitted data packets 310 in case one or more of the transmitted data packets 310 were incorrectly or incompletely received at the first device. In case of issues in the transmission/reception, the integrity signal 314 may be representative of an integrity of the reception of at least one data packet 310 of the transmitted data packets 310 (illustratively, within the predefined number) being outside a predefined integrity range. In general, the integrity signal 314 may be representative of an integrity of the reception of one, more than one, or all data packets 310 being outside the predefined integrity range. Illustratively, in this scenario, the integrity signal 314 may be representative of an integrity being outside an acceptable range, e.g. may be representative of an error level being outside an acceptable error range. The predefined (acceptable) integrity may be selected according to the specific application for the first device and second device, e.g. according to the type of data, desired properties of the communication, etc.

In this scenario, the first processor may be configured to prompt the second device to retransmit the at least one data packet, illustratively the data packet(s) for which the integrity signal 314 indicates an incorrect/incomplete reception. As an exemplary configuration, the first processor may be configured to prompt the second device to retransmit at least part of the (already transmitted) plurality of data packets 310 starting from the at least one data packet. Illustratively, the first processor may be configured to ask the second device to retransmit the incorrectly received data packet and all the subsequent data packets (e.g., in a sequence). In case of a sequence of data packets 310, the at least one data packet 310 for which the integrity signal 314 indicates an incorrect/incomplete reception may be at a certain position within the sequence (e.g., may be the third data packet 310-3 in the exemplary scenario illustrated in FIG. 3E). The first processor may be configured to prompt the second device to retransmit part of the sequence starting from the at least one data packet 310-3.

In a corresponding manner, the second processor may be configured to retransmit the at least one data packet 310 upon receiving the integrity signal 314 representative of the integrity of the reception of at least one data packet 310 being outside the predefined integrity range. As an exemplary configuration, the second processor may be configured to retransmit at least part of the (already transmitted) plurality of data packets 310 starting from the at least one data packet. In case of a sequence of data packets 310, the second processor may be configured to retransmit part of the sequence starting from the at least one data packet 310-3. The retransmission of part of the sequence may be particularly advantageous, without limitation, in the context of relative sensor data, in which subsequent data packets 310 within the sequence are interrelated with one another considering the relative variation of a physical quantity.

Figure 3F:
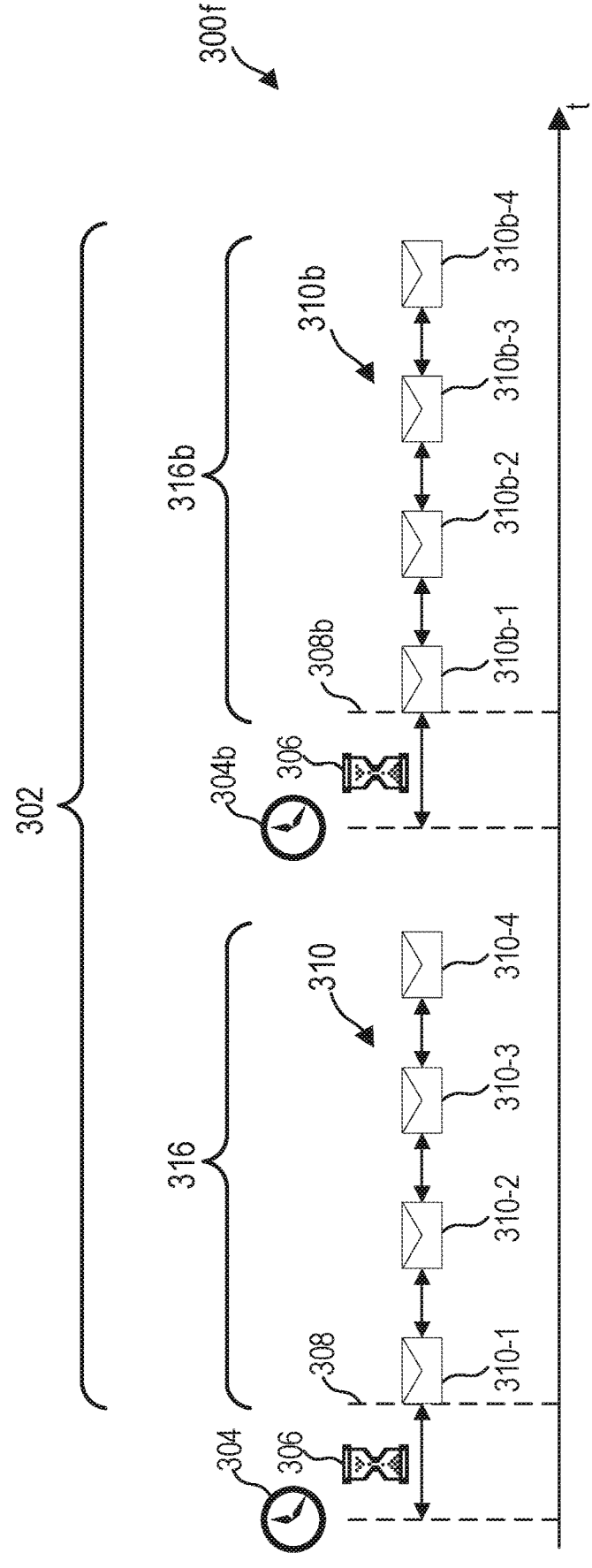

As shown in the graph 300f in FIG. 3F, in an exemplary configuration, the isochronous data 302 may include a plurality of isochronous sequences 316, 316b of data packets 310, 310b, e.g. a first sequence 316 and a second sequence 316b in the exemplary case in FIG. 3F (or any suitable number of isochronous sequences, e.g. a third sequence, a fourth sequence, etc.). In this case, the first processor may be configured to define a respective reference time point 304, 304b for each isochronous sequence 316, 316b. Illustratively, the first processor may be configured to schedule different reference time points 304, 304b, and thus different starting time points 308, 308b for the different isochronous sequences 316, 316b. In a corresponding manner, the second processor may be configured to receive for each isochronous sequence 316, 316b, the respective reference time point 304, 304b. For each isochronous sequence 316, 316b, the respective reference time point 304, 304b and the time-offset 306 associated with the second device may define a respective starting time point 306, 306b for the second device to start transmitting the isochronous sequence 316, 316b. For example, the different sequences 316, 316b of data packets may belong to different logical groups of data (e.g., different CIGs, in the context of BLE-communications).

Each isochronous sequence 316, 316b may be associated with a respective data transmission interval. Illustratively, the second processor may be configured to transmit the sequences 316, 316b during different time intervals, e.g. one sequence after the other. The respective reference point 304, 304b in combination with the time-offset 306 may define the start of the respective data transmission interval, as discussed in relation to FIG. 3B.

FIG. 4A to FIG. 4F each shows a respective graph 400a, 400b, 400c, 400d, 400e, 400f illustrating a communication between a central device 402 and one or more peripheral devices 404, 406, 408, 410 according to the approach described in relation to FIG. 2 to FIG. 3F. The graphs 400a to 400f illustrate thus the application of the low-latency communication strategy described herein to the context of BLE-communications between a BLE-central and one or more BLE-peripherals. In the graphs 400a to 400f the signals (e.g., the data packets) that a certain device transmits (e.g., the central 402, a first peripheral 404, a second peripheral 406, etc.) are characterized by a corresponding pattern.

Within the BLE-context, the approach described herein defines a new type of transport, called "report events". The new type of transport defines isochronous stream of data from peripheral to central, without a need for the central to address the peripheral. The central may solicit the report via a one-time configuration based on existing known transport, the so-called CIG (Connected Isochronous Group) discussed above. The central may configure the peripheral stream to be at an offset relative to the CIG anchor point, so that the peripherals are later free to send reports at regular interval, in the most efficient manner. In this configuration, the central (e.g., a PC) will be in receive mode most of the time, while the peripheral(s) (e.g., sensors) may be constantly sending the flow of data (e.g., absolute or relative coordinates).

In case of absolute sensor data, for example absolute coordinates, a drop of a single report (e.g., due to interference) may be replaced by the next report, for example as a new absolute position. The central may thus receive the reports with high efficiency and high rate, without the need for feedback from central in a form of ACK/NAK. The same applies for button presses which are sent as absolute state of the device for a given duration. In case of relative sensor data, for example relative coordinates, a drop of a single report event (e.g., due to interference) could cause a malfunction, for example a cursor jump. In this case, the central may schedule a one time packet (illustratively, the integrity signal) to acknowledge a batch of reports from peripheral. In case of a negative acknowledge on a report number, the peripheral may retry the reports again beginning from the missing report number, so integrity of the relative reports is maintained.

The new transport described in the present disclosure may be referred to herein as CIR (Connected Isochronous Report), e.g. in the BLE-context. With report events, the central may configure a fixed offset in relation to a CIG anchor point. The central may then move to receive-only mode, while the peripheral (e.g., sensor peripheral) may be in transmit-only mode. The advantage of the CIR is higher efficiency and lower latency. Due to these advantages, the peripherals may send higher rate of reports, which is particularly beneficial for gaming, or body and head tracking application. This enables higher performance for applications based on absolute/relative sensor coordinates. Additional benefits are power saving due to optimization of the transceiver; TX only mode in sensor, and RX only mode in PC, saving to need for transitions between RX to TX.

The graph 400a in FIG. 4A shows a time diagram for the CIR-approach, e.g. in case of absolute (sensor) data. In the BLE-context, the CIR may be a new transport associated to the existing CIG (Connected Isochronous Group). The central 402 may be configured to create a CIR as part of a CIG, thus allowing the peripheral(s) 404 to send report events (illustratively, data packets) at regular ultra-low latency intervals. The central 402 may be configured to add the CIR by defining a 'report offset' (an example for the first time-offset of the time-offset associated with the peripheral) in relation to the CIG anchor (an example for the reference time point). The central 402 may be further configured to define a peripheral offset (an example for the second time-offset of the time-offset associated with the peripheral) in such a way that the central knows to expect reports (illustratively, isochronous data packets) from the specific peripherals 404 at regular intervals (isochronous intervals). In the exemplary configuration in FIG. 4A, the peripheral may send four reports 0, 1, 2, 3 during a first CIR interval, further reports 4, 5, . . . during a second CIR interval, etc. It is understood that 4 report events is an exemplary number, and that the number of report events may be even higher (e.g., 10 report events, or more than 10 report events), with no additional overhead and latency. In the case of absolute sensor data, as an example, each report event may allow the peripheral 404 to send new absolute coordinates of body or head position, allowing ultra-low latency operation.

Figure 4C:
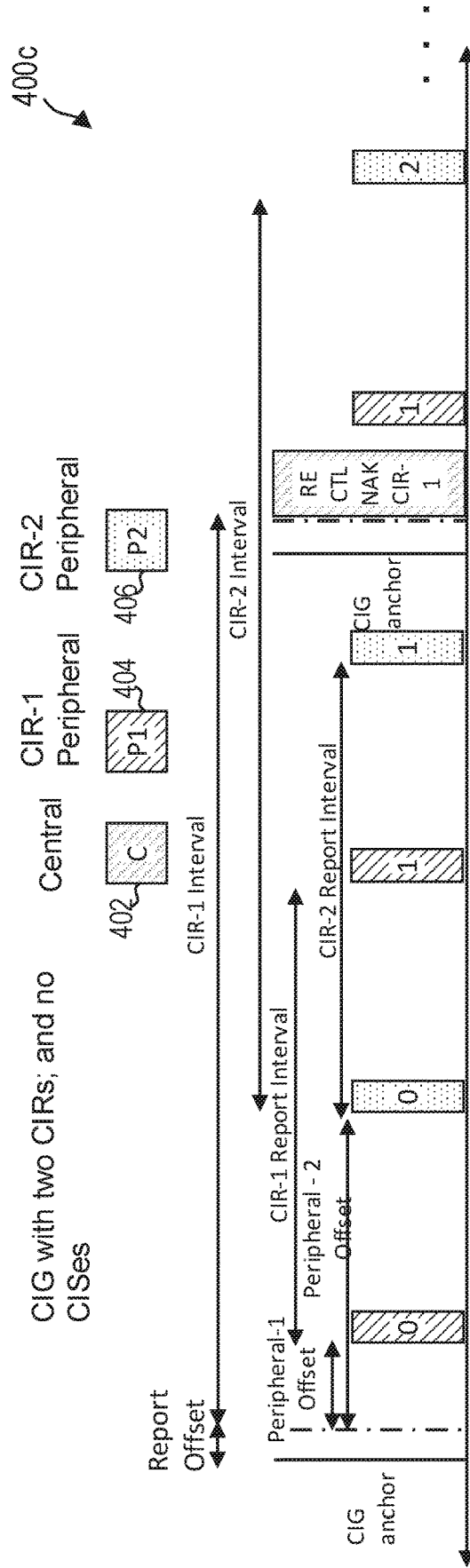

The report offset may thus define the relative position of the report event anchors. The central device may use the report offset as a scheduling tool, to position the peripheral at a given time offset from the CIG anchor. In such a way, the CIR anchor (an example for the starting time point) is at an offset from the CIG anchor. This further allows to group a few peripheral devices together, as shown in FIG. 4C, each one with a different offset from the other. Illustratively, each peripheral may have a dedicated position.

The graph 400*b* in FIG. 4B illustrates the scenario in which the central 402 transmits an integrity signal to the peripheral after transmission of a batch of report events (e.g., after the first 4 report events in the exemplary scenario in FIG. 4B). The data communication in FIG. 4B may apply for example to the case in which the peripheral sends relative data, e.g. relative sensor data. In relative CIR reports, integrity in reception may be relevant for each report. In this scenario, in each CIG anchor, the central may be configured to send a beacon packet (an example of the integrity signal) which indicates which CIR the central received correctly. FIG. 4B shows the case in which the central 402 did not receive correctly the report events (and thus sends a NAK signal, as an example). The peripheral 404 may thus retransmit the report events in response to the beacon packet. The beacon packet may be a RE-CTL signal including a NAK or an ACK.

The central 402 may use one RE-CTL in each CIG to indicate to all peripherals which peripheral should retry the reports (e.g., at least one report, or at least a part of the reports). In some CIGs, the RE-CTL may be dispensed with. If present, the RE-CTL may NAK one or more reports from a given peripheral (reliability option; depends on the use case).

The graph 400*c* in FIG. 4C illustrates the scenario with more than one peripheral, e.g. with two peripherals 404, 406. In case of more than one peripheral (e.g., more than one sensor peripheral), each peripheral 404, 406 may be configured with a different peripheral offset. Once the central 402 defines the report offset and the peripheral offsets, the peripherals 404, 406 may transmit at regular intervals according to the number of report events in each CIG. In the exemplary case in FIG. 4C the central 402 receives correctly the report events of the second peripheral 406 (the central may send an ACK in this case), so that the second peripheral 406 may transmit "new" report events in the second data transmission interval. However, the central 402 receives incorrectly the report event 1 of the first peripheral 404, so that the first peripheral retransmit the report event 1 (and subsequent report events, if present) in response to the beacon packet from the central 402 (e.g., indicating a NAK).

Figure 4D:
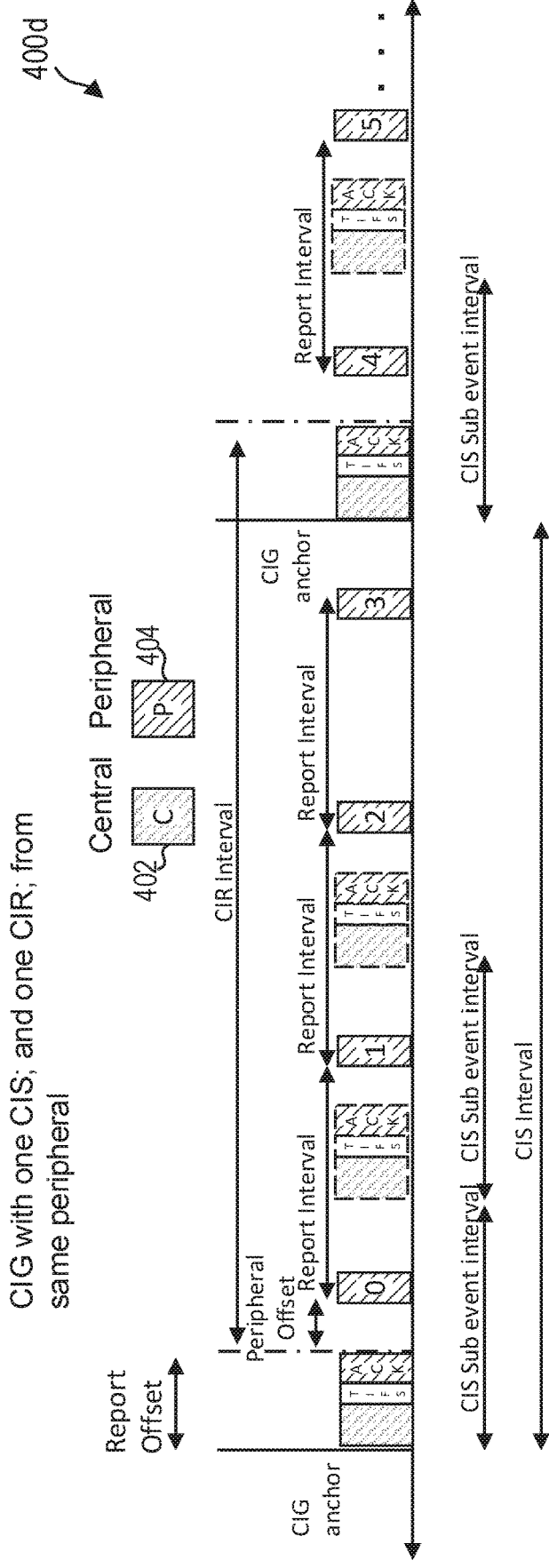

The graph 400*d* in FIG. 4D illustrates the scenario in which the CIR-approach is combined with the CIS-transmission of the BLE-technology. In the exemplary configuration in FIG. 4D, the report events from the peripheral 404 are interleaved with CIS from the same peripheral 404, in which the central 402 sends a request to the peripheral 404, and in which the peripheral 404 responds to the request from the central 402. The peripheral reports according to the present disclosure may thus be introduced as part of the CIG in combination with one or more CISs (e.g., in combination with audio streams, as an example), so that the CIR and the CIS may be time aligned to the (same) CIG.

Figure 4E:
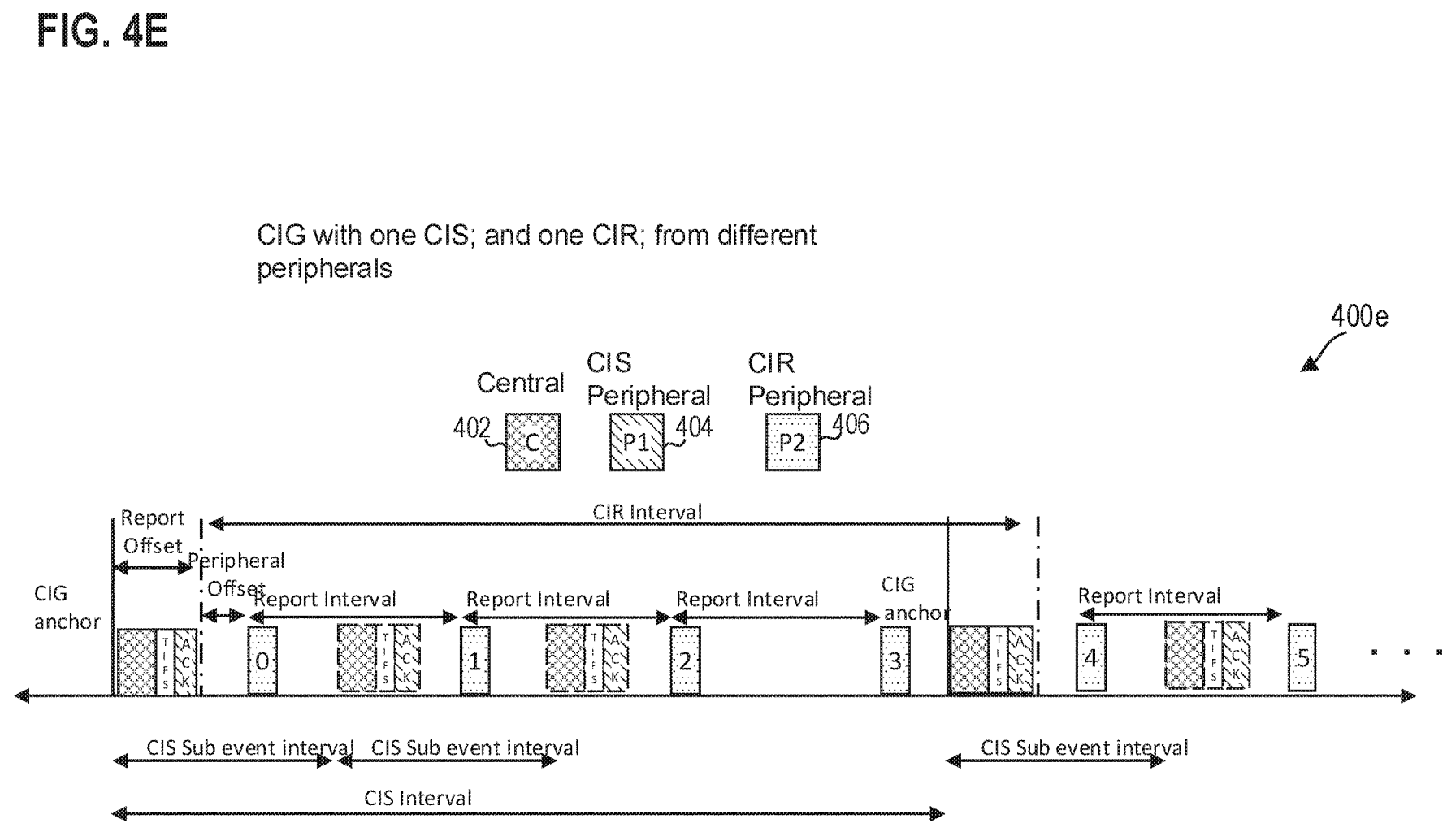

The graph 400*e* in FIG. 4E illustrates a scenario similar to FIG. 4D, however with the distinction that one peripheral

404 communicates with the central 402 using CISs, whereas another peripheral 406 communicates with the central 402 using CIRs.

Figure 4F:
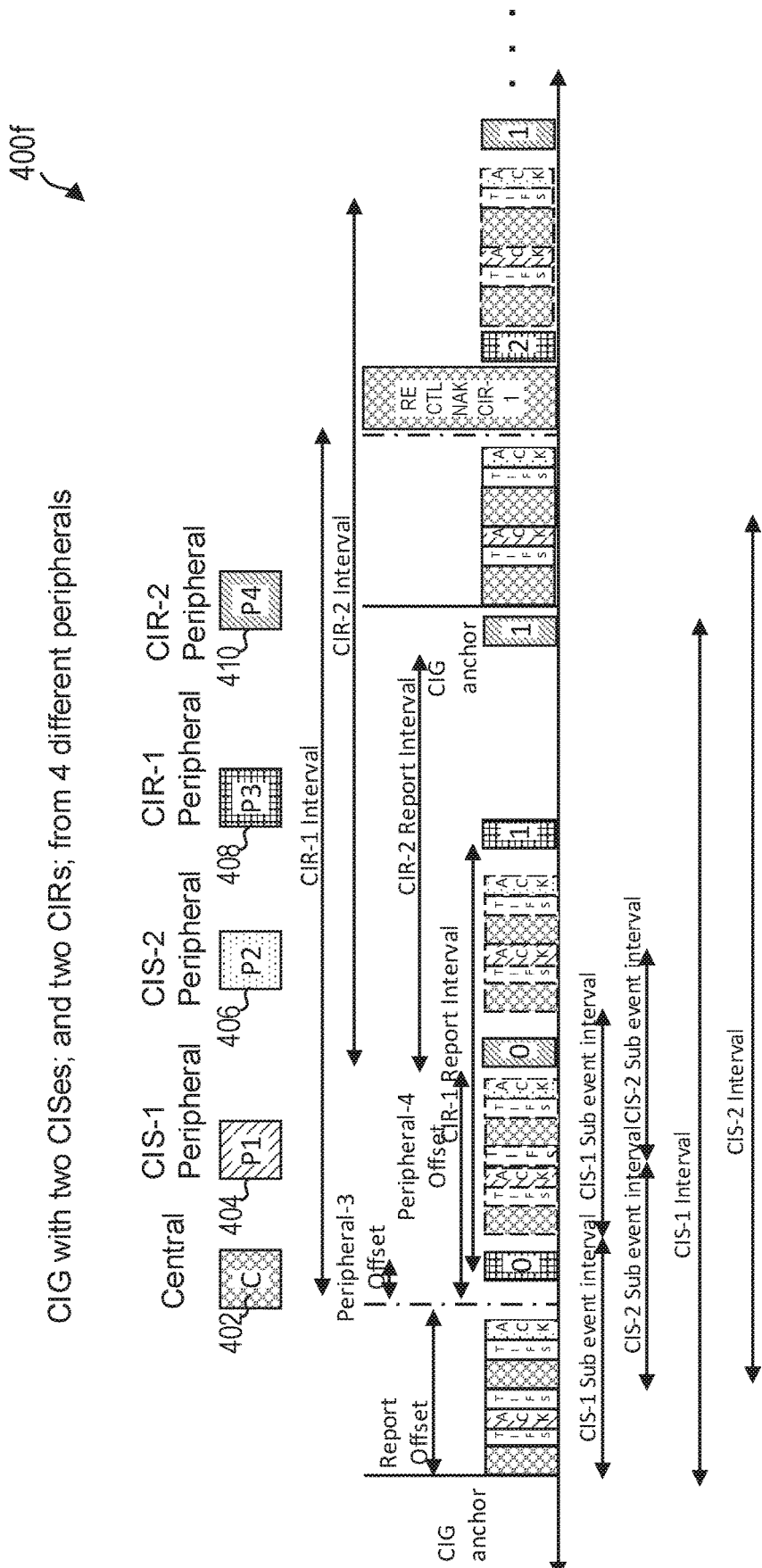

The graph 400*f* in FIG. 4F illustrates a more complex scenario with four peripherals 404, 406, 408, 410, in which a first peripheral 404 and a second peripheral 406 communicate with the central using respective CISs, whereas a third peripheral 408 and a fourth peripheral 410 communicate with the central using CIRs. The fourth peripheral 410 may retransmit the report event 1 in response to the integrity signal from the central 402 indicating an incorrect/incomplete reception.

The approach described herein is suitable for a variety of use cases in which the central should receive low latency reports from the peripherals. Examples are head rotation, gaming audio and gaming human interface devices. In an exemplary configuration, the peripheral reports may stay closely synced to the audio (e.g., in case of the CIR being interleaved with CIS). The approach described herein may thus be understood, in the BLE-context, as an expansion of the conventional CIG configuration. As an example, a peripheral report event may be a small packet, e.g. with a size between 10 Bytes and 20 Bytes. According to the approach described herein, a CIG may thus include one or more CISs (Connected Isochronous Streams), one or more CIRs (Connected Isochronous Reports), and/or a combination of CISs and CIRs. A CIG may include CISs and CIRs from the same peripheral or from different peripherals. Illustratively, the CIG may include report events (RE) in addition to the sub-events of the CIS.

Figure 5A:
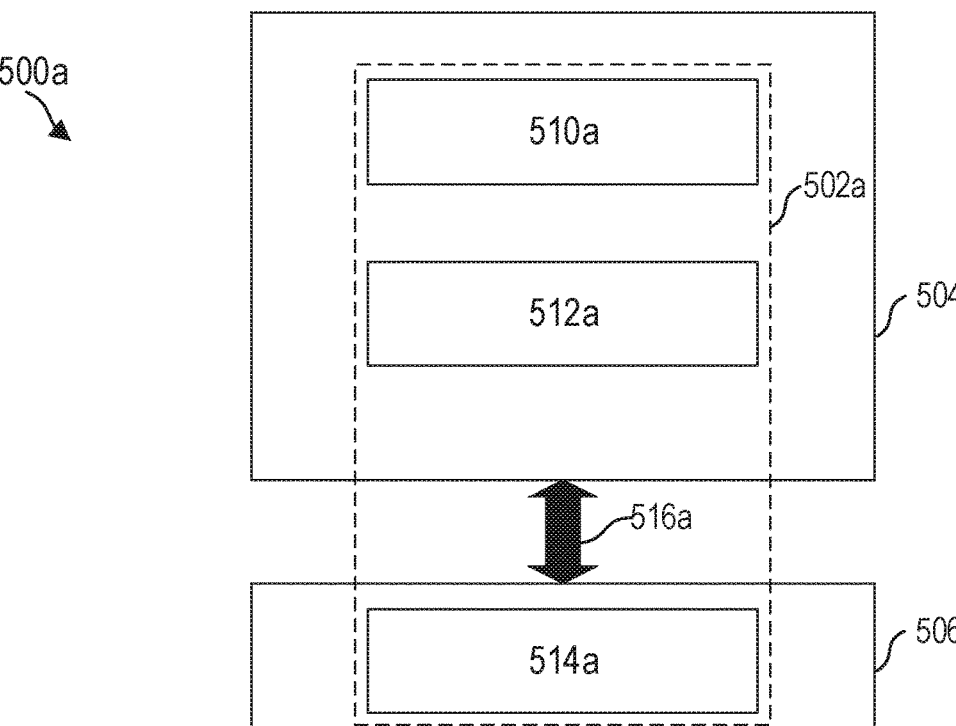
FIG. 5A and FIG. 5B each shows an exemplary device for use in a communication system, in a schematic representation according to the present disclosure.
Figure 5B:
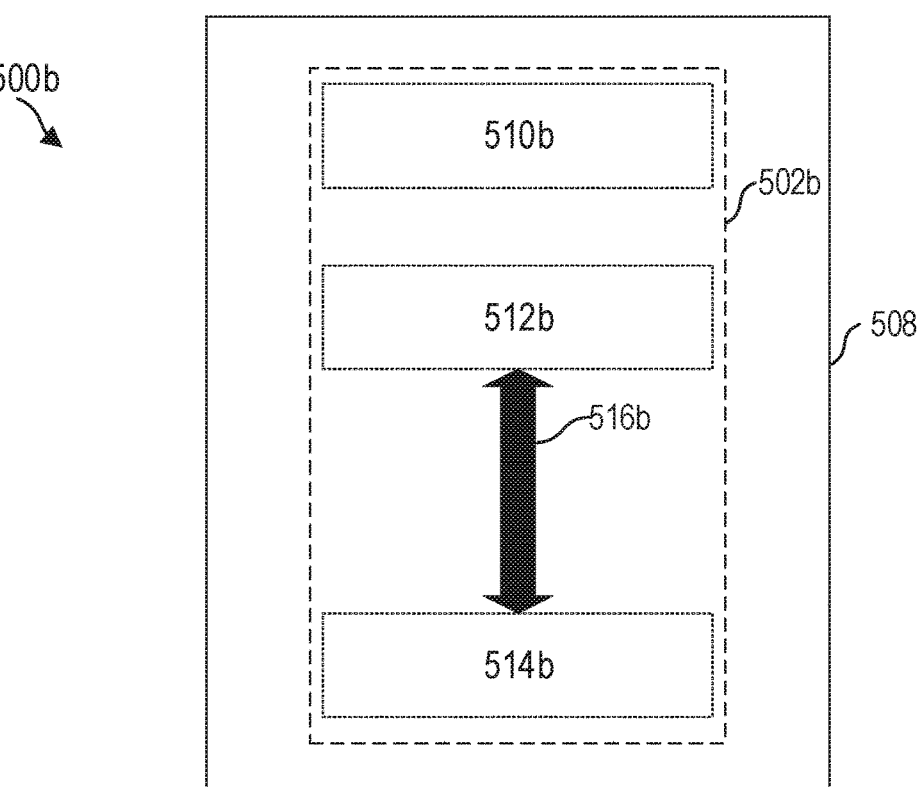

FIG. 5A and FIG. 5B each shows an exemplary configuration of a device 500*a*, 500*b* in a schematic representation according to the present disclosure. The device 500*a*, 500*b* may provide an example of a device for use in a communication system (e.g., in the communication system 200). The device 500*a*, 500*b* may thus be an exemplary configuration of a first device and/or a second device communicating with one another (e.g., an exemplary configuration of the first device 202 and the second device 204). The representation in FIG. 5A and FIG. 5B may relate, in particular, to the BLE-context, but it is understood that the details described in relation to FIG. 5A and FIG. 5B may apply in a corresponding manner to other technologies.

The device 500*a*, 500*b* may include a processor 502*a*, 502*b* configured to control an operation of the device 500*a*, 500*b*. In an exemplary configuration, as shown in FIG. 5A, the processor 502*a* may be distributed among more than one circuit, e.g. may be distributed between two separate circuits 504, 506, or between more than two separate circuits. This configuration may be, for example, the configuration of a central device for BLE-applications, in which part of the functionalities are carried out in a main circuit (e.g., a central processor may carry out the data processing, the data storage, etc.) and other (simpler) functionalities, such as providing the physical layer for the connection with another device, are carried out in a separate circuit. In another exemplary configuration, as shown in FIG. 5B, the processor 502*b* may be disposed within a single circuit 508. This configuration may be, for example, the configuration of a peripheral device for BLE-applications, in which the simpler nature of the overall functionalities allows a more compact structure and a reduced power consumption, without the need for extensive processing power or storage space.

The functionalities of the processor 502*a*, 502*b* may be logically divided into a plurality of portions (e.g., into a plurality of dedicated parts of the processor 502*a*, 502*b*, such as a plurality of dedicated sub-circuits). Considering the BLE-context, the processor 502a, 502b may include application 510a, 510b, host 512a, 512b, and controller 514a, 514b. Application 510a, 510b, host 512a, 512b, and controller 514a, 514b may be logic constructs assigned to different parts of the functionality of the device 500a, 500b, e.g. to different parts of the BLE layer stack, as discussed in further detail below. As an example, application 510a, 510b, host 512a, 512b, and controller 514a, 514b may be implemented in firmware.

The application 510a, 510b may be the uppermost layer, and may be configured to carry out the functions (e.g., user interface, data handling, logic operations, and the like) related to a specific operation of the device 500a, 500b, e.g. the functions related to a specific use or scenario in which the device 500a, 500b is employed.

The host 512a, 512b may include the higher layers of the protocol stack, below the application layer, and may be configured to carry out network and transport protocols to enable device-to-device communication (illustratively, to enable applications in different devices to interact with one another). In the BLE-context, the host 512a, 512b may include a plurality of layers, such as Generic Access Profile (GAP), Generic Attribute Profile (GATT), Logical Link Control and Adaptation Protocol (L2CAP), Attribute Protocol (ATT), Security Manager (SM), and Host Controller Interface (HCI) at the host side.

The controller 514a, 514b may include the lower layers of the protocol stack and may be configured to carry out low-level, real-time protocol functions to provide device-to-device communication. In the BLE-context, the controller 514a, 514b may include a plurality of layers, such as Host Controller Interface (HCI) at the controller side, Link Layer (LL), and Physical Layer (PHY). The Link Layer may be configured to schedule data reception and transmission (e.g., reception and transmission of data packets, e.g. reception and transmission of event reports within the context of the adapted strategy described herein).

In BLE-technology, the host 512a, 512b and the controller 514a, 514b may be configured to communicate with one another via a standardized communication interface 516a, 516b, the so-called Host Controller Interface (HCI). The HCI protocol may define the type of data, instructions, requests, responses, etc. that a host 512a, 512b may send to a controller 514a, 514b, and vice versa. The HCI may include different types of physical transports such as USB, UART (Universal Asynchronous Receiver/Transmitter), and/or SPI (Serial Peripheral Interface), as examples.

The structure of the BLE layer stack and the standardized communication interface between host and controller allow providing a dual-chip architecture (FIG. 5A) or a single-chip architecture (FIG. 5B) depending on the desired configuration. In the dual-chip architecture one circuit 504 may include application 510a and host 512a, and another circuit 506 may include the controller 514a. This configuration allows combining hosts and controllers from different manufacturers. In the single-chip architecture (illustratively, a system-on-chip configuration), a single circuit 508 (e.g., a single microcontroller) may include application 510b, host 512b, and controller 514b.

It is understood that the representation of the device 500a, 500b in FIG. 5A and FIG. 5B may be simplified for the purpose of illustration, and the device 500a, 500b may include additional components with respect to those shown. As an example, the device 500a, 500b may include a communication interface, e.g. radio hardware, configured to implement analog and/or digital processing to enable the communication. For example, the communication interface may include a transmitter circuit configured to implement functions related to data transmission, such as frequency up-conversion, filtering, digital-to-analog conversion, and the like. As another example, additionally or alternatively, the communication interface may include a receiver circuit configured to implement functions related to data reception, such as frequency down-conversion, filtering, analog-to-digital conversion, and the like. As a further example, the communication interface may include one or more antennas, e.g. an antenna array.

Figure 6A:
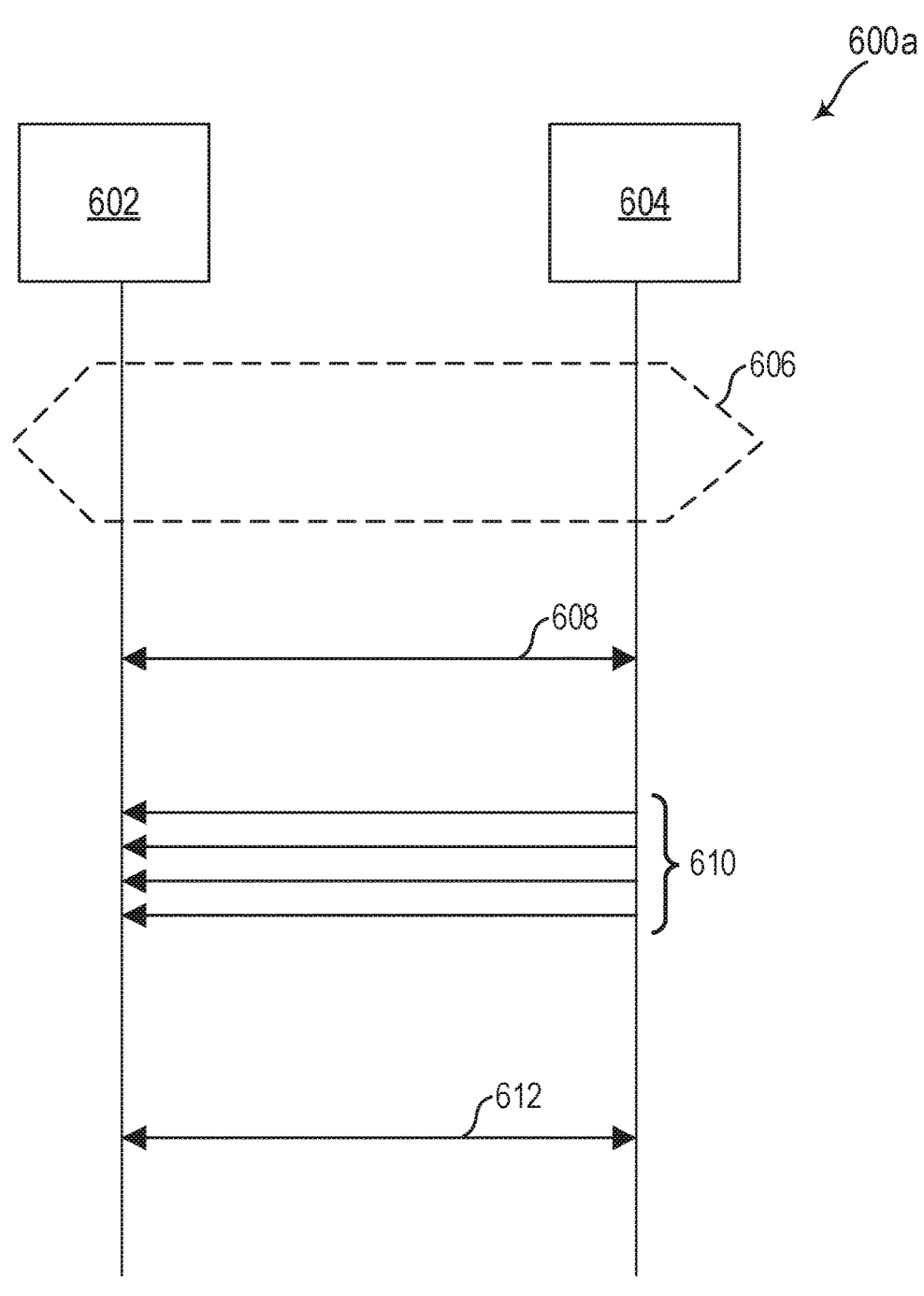
FIG. 6A and FIG. 6B each shows an exemplary diagram of a communication flow between a first device and a second device according to the present disclosure.

FIG. 6A shows an exemplary diagram 600a of a communication flow between a first device 602 and a second device 604 according to the present disclosure. The diagram 600a may represent a communication according to the strategy described herein, e.g. as described in relation to FIG. 2 to FIG. 3F. The first device 602 and the second device 604 may be configured as the first device 202 and the second device 204 described in relation to FIG. 2.

In an exemplary configuration, the first processor of the first device 602 may be configured to carry out a negotiation 606 with the second device 604 (illustratively, with the second processor). The negotiation 606 may include defining one or more properties of a communication between the first device 602 and the second device 604, e.g. of a data transmission from the second device 604 to the first device 602. As exemplary properties, the negotiation 606 may include one or more of: a type of the isochronous data, a reliability (e.g., in case of relative sensor data), a bandwidth for an application configured to run on the second device 604 and generate the isochronous data, a data transmission interval for transmission of the isochronous data, and/or a combination thereof. For example, the first processor and the second processor may be configured to carry out the negotiation via a control signaling connection.

In an exemplary configuration, the first processor of the first device 602 may be configured to define one or more data transmission parameters for the data transmission from the second device 604 to the first device 602, and may be configured to transmit 608 the one or more data transmission parameters to the second device 604 (e.g., to the second processor). The one or more data transmission parameters may include, as examples, one or more of: a data transmission interval, a number of data packets within a data transmission interval, a time-offset associated with the peripheral device, a size of a data packet, and/or a combination thereof. The first device 602 defining the one or more data transmission parameters may allow configuring the data transmission to a specific scenario according to an overall operation of the first device, e.g. taking into account further operations and/or further data transmissions of which the second device may not be aware.

The second device 604 may then carry out the data transmission 610 (e.g., the transmission of a plurality of data packets) according to the negotiated/defined parameters and properties of the data transmission. The first processor may then be configured to terminate 612 the data transmission upon completion of a predefined task, e.g. upon closing of an application using the data.

Figure 6B:
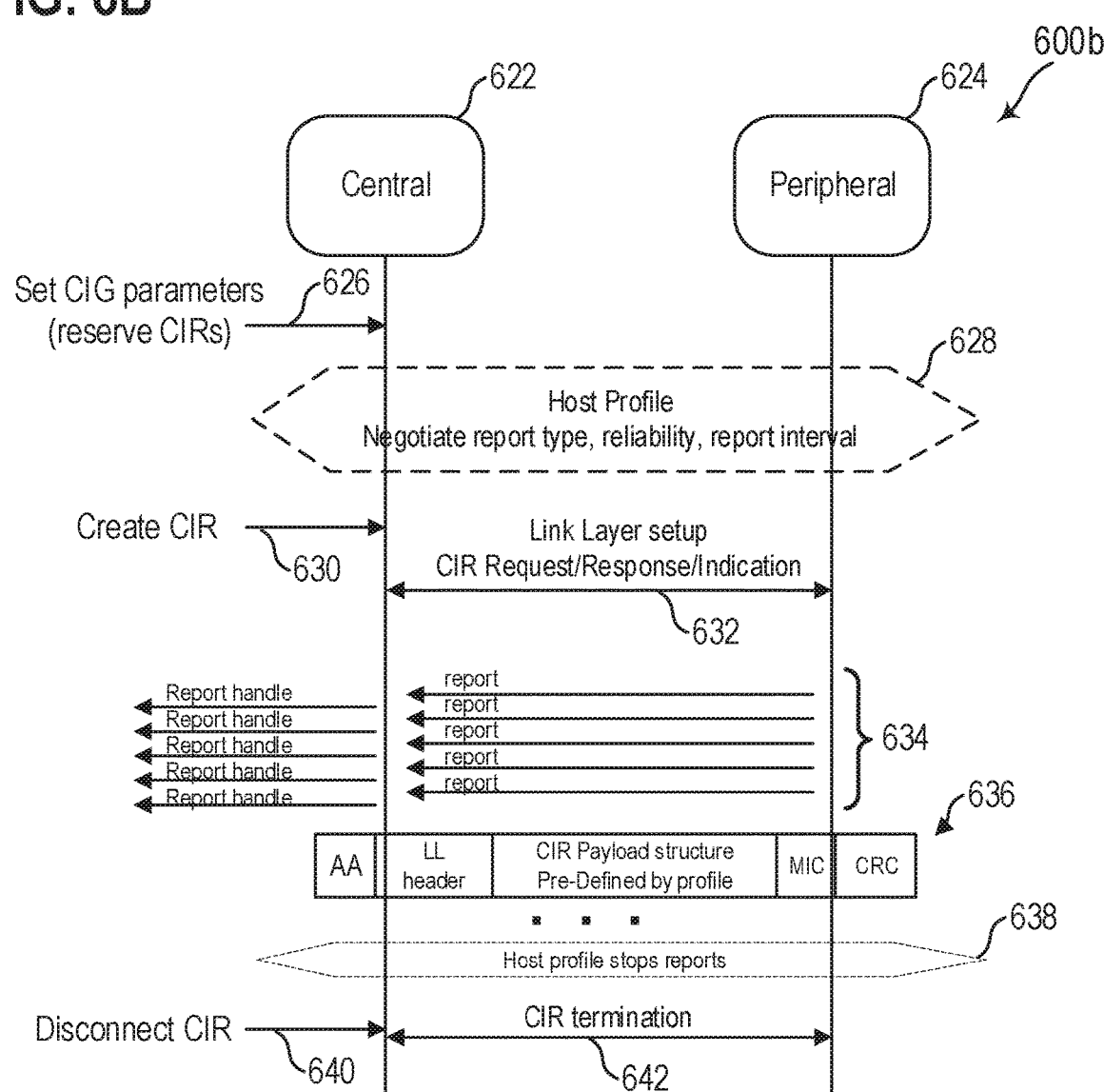

FIG. 6B shows an exemplary diagram 600b of a communication flow between a central device 622 and a peripheral device 624 according to the present disclosure. Illustratively, the diagram 600b may be an exemplary configuration of the strategy described herein (and of the operations described in relation to FIG. 6A) in the BLE-context.

In an exemplary configuration the host of the central device 622 may be configured to define the data transmission parameters, e.g. CIG parameters, and may be configured to transmit 626 the data transmission parameters to the controller. This configuration may be particularly beneficial, without limitation, in the case that the host and the controller are disposed on separate circuits (e.g., on separate chips), as described in relation to FIG. 5A, so that the host as part of a main component of the central device may schedule the data transmission taking into account the overall operation of the central.

In response to setting/receiving the data transmission parameters, the first processor of the first device, e.g. the controller of the central device 622, may be configured to reserve bandwidth for the isochronous data, e.g. reserve bandwidth for the connected isochronous reports. Illustratively, the controller may be configured to prepare for the reception of the report events from the peripheral 624. The central 622 and the peripheral 624 may be configured to carry out a negotiation 628 with one another according to the host profile, e.g. to define a report type, a reliability, a report interval, and the like. The reliability may vary, for example depending on whether the isochronous data include absolute measurements or relative measurements.

By way of illustration, the operations at 626 and 628 may be understood as the host profile PC configuring the Central Bluetooth controller to start setting quality of service CIG Parameters. As part of the CIG parameters setup by the Host PC, the Central may reserve bandwidth for the CIR parameters. The central 622 may schedule the CIR according to other applications, for example may activate the CIR before audio transmission, or during audio transmission. The parameters (e.g., as examples of one or more properties of a communication between a first device and a second device) may include CIG interval, number of CIRs, report offset, peripheral offset, report interval, SDU (Service Data Unit) size, and a reliability configuration, as examples. In case of relative sensor data, the reliability configuration may specify that the reports are relative and prompts to send back ACK/NAK info (or more in general an integrity signal). The host of the central 622 may communicate the same set of quality-of-service parameters to the peripheral (sensor) 624 over a control signaling connection, to negotiate the required bandwidth for the application (e.g., movement tracking).

The central 622 may configure the CIR. In 630 the controller of the central 622 may be configured to receive a control signal from the host, and may be configured, in 632, to define the time-offset associated with the peripheral 624 in response to receiving the control signal. In an exemplary configuration, the first processor may be configured to prompt the second device to transmit the isochronous data by transmitting the reference point and the time-offset to the second device. Illustratively, the peripheral may move into a state in which the peripheral will send the reports. The setup of the data transmission may occur over the Link Layer of the BLE-protocol stack. Illustratively, the first processor may be configured to establish a connection with the second processor via the Link Layer of the Bluetooth® communications protocol, e.g. the Link Layer of the BLE communications protocol. Furthermore, the first processor may be configured to define a logical transport for the data transmission from the second device (the peripheral 624) to the first device (the central 622) at the Link Layer of the Bluetooth® communications protocol, e.g. the Link Layer of the BLE communications protocol. Additionally or alternatively, the first processor may be configured to transmit the time-offset to the second device (the peripheral 624) via the Link Layer of the Bluetooth® communications protocol, e.g. the Link Layer of the BLE communications protocol. By way of illustration, the operations at 630 and 632 may be understood as the host profile PC sending a "Create CIR" signal to the controller, which sets up CIG/CIR at link layer control.

The negotiation 628 prior to the Link Layer setup 632 ensures that the host of the peripheral 624 will accept the creation of the CIR, since the relevant parameters were already negotiated during the negotiation 628. Illustratively, the controller of the peripheral 624 will ask the host of the peripheral 624 whether to accept the CIR request, and the host of the peripheral 624 will accept the request (providing a positive response). The Link Layer step 632 defines the timing parameters of the data transmission, e.g. the Link Layer step 632 may be the step where the central 622 transmits the time-offset to the peripheral 624

Following the link layer control procedure, the transport may be activated, and the peripheral 624 may initiate the data transmission 634 to the central 622, e.g. the peripheral 624 may transmit sensor data in ultra-low latency, unidirectional manner to the Central 622. The central 622 may be time aligned with the peripheral 624 and receive all CIR PDUs (Protocol Data Units), indicated as reports in FIG. 6B.

The CIR PDUs may include, for example, absolute coordinates sensor payload, relative coordinates, pressure data, and the like. In an exemplary configuration, the first processor may be configured to transmit the isochronous data received from the second device to the host. Illustratively, the data reception may occur at the controller of the central 622, and the controller may be configured to forward the reports to the host for further processing. For example, the controller may receive absolute coordinates sensor payload and forward the relative coordinates sensor payloads to the Host.

An exemplary configuration of a data packet 636 is shown in FIG. 6B. The data packet 636 may include a CIR Payload structure, which may be pre-defined by the profile (illustratively, the host profile of the central 622). Furthermore, the data packet 636 may include one or more further portions, which may be freely adapted according to a desired application, such as, for example, an address portion (AA), a header portion (e.g., Link Layer header), and a trailer portion (e.g., including MIC, Message Integrity Check, CRC, Cyclic Redundancy Check).

In case the central 622 received one or more reports incompletely/incorrectly, the central 622 may prompt the retransmission of such reports. As an example, PDUs that failed CRC (Cyclic Redundancy Check) may be retried after the central reports from which report number to begin the retry.

Once the application time is over (e.g., game over at application), then the Host profiles stops the report flow 638, and disconnect the CIR transport 640 prompting a CIR termination 642.

Figure 6C:
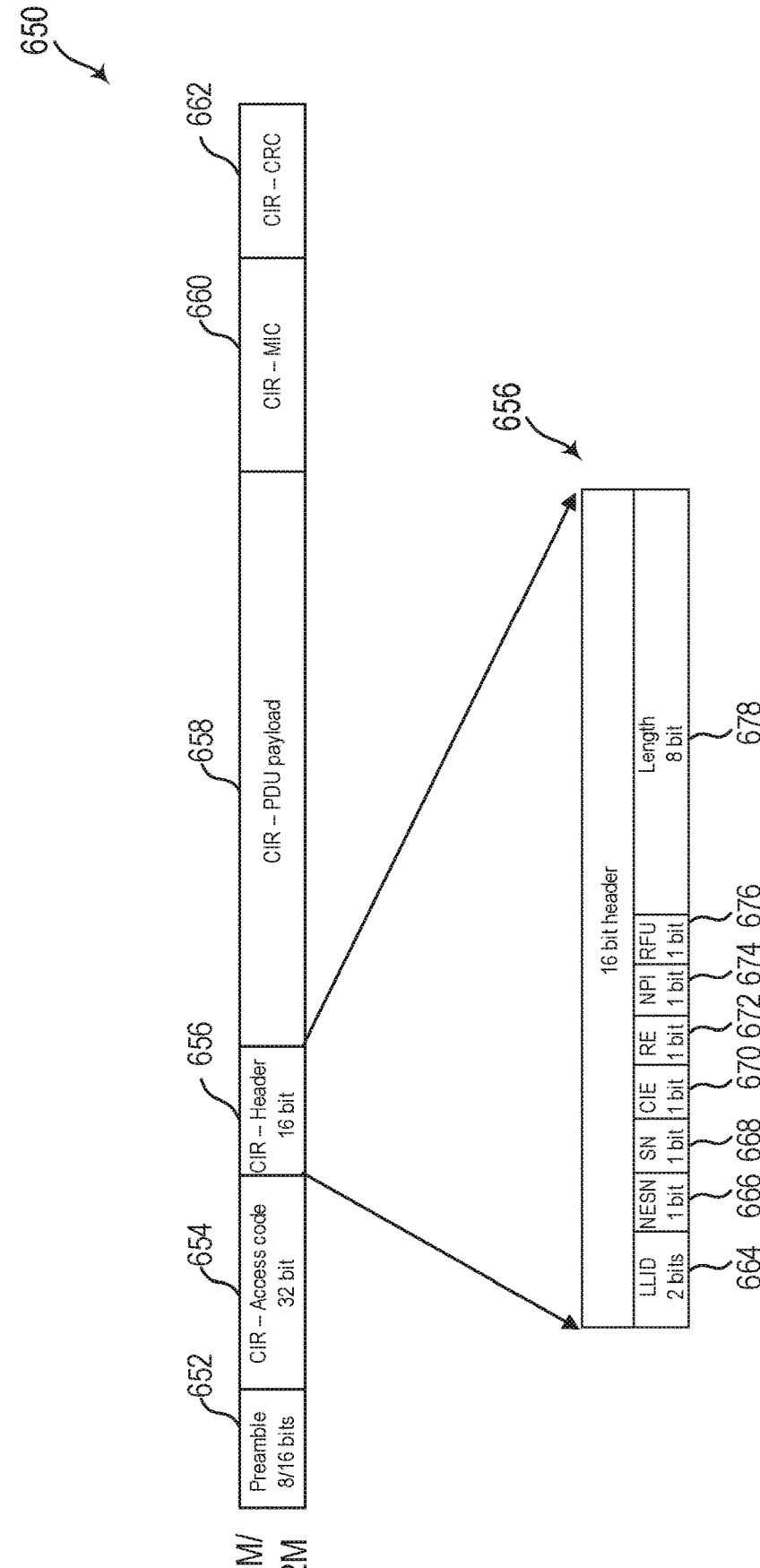
FIG. 6C shows an exemplary data packet in a schematic representation according to the present disclosure.

FIG. 6C shows an exemplary data packet 650 in a schematic representation according to the present disclosure. The data packet 650 may be an example a data packet that a second device transmits to a first device as part of isochronous data, e.g. an example of a data packet that a peripheral transmits to a central. The data packet 650 may be a CIR-data packet, but it is understood that the features described in relation to the data packet 650 may apply in a corresponding manner to a CIS-data packet (e.g., to a data packet including a CIS payload rather than a CIR payload). The data packet 650 may be an exemplary configuration of a data packet 220, 310 described in relation to FIG. 2 to FIG. 3F, e.g. may be an exemplary configuration of a report event described in relation to FIG. 4A to FIG. 4F, e.g. may be an exemplary configuration of a data packet 636 described in relation to FIG. 6B.

The data packet 650 may include a preamble portion 652 (e.g., with size 8-16 bits), an accesso code portion 654 (e.g., with size 32 bits), a header portion 656 (e.g., with size 16 bits), a payload portion 658, and a trailer portion, for example including MIC 660 and CRC 662.

The header portion 656 may include, for example, a Logical Link Identifier (LLID) 664, e.g. with size 2 bits, for example SDU fragments/segments, a Next Expected Sequence Number (NESN) 666, e.g. with size 1 bit, a sequence number (SN) 668, e.g. with size 1 bit, a Close Isochronous Event (CIE) 670, e.g. with size 1 bit, a report event (RE) 672, e.g. with size 1 bit, a Null Packet Indication (NPI) 674, e.g. with size 1 bit, a portion reserved for future use (RFU) 676, e.g. with size 1 bit, and a length portion 678, e.g. with size 8 bit.

FIG. 7A, FIG. 7B, FIG. 7C each shows a schematic flow diagram of a method 700a, 700b, 700c of carrying out communication between a first device and a second device according to the present disclosure. The method 700a, 700b, 700c may be a method of managing a data transmission from the second device to the first device. As an example, the method 700a, 700b, 700c may be a method of managing a data transmission from a peripheral device to a central device, e.g. in a BLE-network. It is understood that, in general, the details discussed in relation to the device(s) in FIG. 2 to FIG. 6C may apply in a corresponding manner to the methods 700a, 700b, 700c, and vice versa.

With reference to FIG. 7A, the method 700a may include, in 710, determining (e.g., defining) a reference time point for the data transmission from the second device to the first device. The method 700a may further include, in 720, determining (e.g., defining) a (unique) time-offset associated with the second device. The reference time point and the time-offset define a starting time point for the second device to start the data transmission. Illustratively, the method 700a may include uniquely assigning a time-offset to the second device for the transfer of data to the first device. As an example, the method 700a may include defining a first time-offset (e.g., a report offset) and a second time-offset (e.g., a peripheral offset), e.g. as described in relation to FIG. 3B.

The method 700a may include, in 730, carrying out the data transmission from the second device to the first device in accordance with the starting time point. The data transmission may include transmitting isochronous data from the second device to the first device. Illustratively, the method 700a may include initiating a transmission of isochronous data from the second device to the first device starting from the starting time point (e.g., the method 700a may include transmitting a first data packet of the isochronous data at the starting time point).

During the data transmission any further interaction between the first device and the second device may be dispensed with. As an example, the method 700a may further include refraining, by the first device, from transmitting a request signal to the second device for prompting the transmission of a data packets, e.g. refraining by the first device from prompting a response from the second device for each data packet that the second device has to transmit. In a corresponding manner, the method 700a may further include refraining, by the second device, from waiting for a request signal from the first device during the transmission of the isochronous data, e.g. the method 700a may include transmitting, by the second device, each data packet without waiting for a corresponding request signal from the first device.

In an exemplary configuration, the method 700a may further include generating an integrity signal representative of a reception at the first device of the isochronous data, e.g. of a reception of data packets in the isochronous data. The method 700a may further include generating the integrity signal for a batch of data packets, e.g. after transmission of a predefined number of data packets by the second device. The method 700a may further include prompting a retransmission of one or more (already transmitted) data packets based on the integrity signal.

The methods 700b, 700c in FIG. 7B and FIG. 7C describe the communication from the standpoint of the first device (FIG. 7B) and second device (FIG. 7C), respectively.

From the standpoint of the first device, the method 700b may include, in 735, determining (e.g., defining) a reference time point for the data transmission from a second device to the first device. The method 700b may further include, in 745, determining (e.g., defining) a time-offset associated with the second device. The reference time point and the time-offset define a starting time point for the second device to start the data transmission. The method 700b may further include, in 755, receiving isochronous data at the first device based on the starting time point, e.g. receiving isochronous data starting from the defined starting time point.

From the standpoint of the second device, the method 700c may include, in 765, receiving a reference time point for the data transmission from the second device to a first device. The method 700c may further include, in 775, receiving a time-offset associated with the second device. The reference time point and the time-offset define a starting time point for the second device to start the data transmission. The method 700c may further include, in 785, transmitting isochronous data to the first device based on the starting time point, e.g. initiating the transmission of the isochronous data starting from the defined starting time point.

In the following, various examples are provided that refer to the communication system 200, the devices 202, 204, 500a, 500b, 602, 604, 622, 624, and methods 700a, 700b, 700c.

Example 1 is a device (e.g., a central device, for example a central device for use in a BLE-network) including: a communication interface configured to communicatively couple the device with a peripheral device; and a processor configured to: define a reference time point for a data transmission from a second device (e.g., a peripheral device, for example a peripheral device for use in a BLE-network) to the device; define a time-offset associated with the second device; transmit the reference time point and the time-offset to the second device; and receive from the second device isochronous data via the communication interface, and the reference time point and the time-offset define a starting time point for the second device to start transmitting the isochronous data. Illustratively, the processor may be configured to receive a plurality (e.g., an isochronous sequence) of data packets starting from the starting time point.

In Example 2, the device according to example 1 may optionally further include that the time-offset associated with the second device includes a first time-offset and a second time-offset, that the first time-offset defines, with respect to the reference time point, an initial time point of a data transmission interval associated with the data transmission from the second
device to the (first) device, and that the second time-
offset defines, with respect to the initial time point of
the data transmission interval, the starting time point
for the second device to start transmitting the isochro-
nous data. As an example, considering a BLE-configu-
ration, the processor may be configured to use the first
time-offset to add the transmission of the isochronous
data to a CIG.

In Example 3, the device according to example 1 or 2 may
optionally further include that the isochronous data
include a plurality of data packets, and that the data
packets of the plurality of data packets are spaced at
isochronous time intervals with respect to one another.

In Example 4, the device according to example 3 may
optionally further include that the processor is further
configured to: transmit an integrity signal to the second
device after a transmission from the second device of a
predefined number of data packets, and the integrity
signal is representative of an integrity of a reception at
the device of the transmitted data packets.

In Example 5, the device according to example 4 may
optionally further include that in case the integrity
signal is representative of an integrity of the reception
of at least one data packet of the transmitted data
packets being outside a predefined integrity range, the
processor is further configured to prompt the second
device to retransmit the at least one data packet.

In Example 6, the device according to example 4 or 5 may
optionally further include that in case the integrity
signal is representative of an integrity of the reception
of at least one data packet of the transmitted data
packets being outside a predefined integrity range, the
processor is further configured to prompt the second
device to retransmit at least part of the plurality of data
packets starting from the at least one data packet.

In Example 7, the device according to any one of
examples 3 to 6 may optionally further include that the
processor is further configured to, for each data packet
of the plurality of data packets, refrain from transmit-
ting a request signal to the second device for prompting
the transmission of the data packet.

In Example 8, the device according to any one of
examples 3 to 7 may optionally further include that the
processor is further configured to refrain from trans-
mitting a feedback signal to the second device for each
data packet of the plurality of data packets.

In Example 9, the device according to example 8 may
optionally further include that the feedback signal
includes one of an acknowledgment signal or a nega-
tive acknowledgment signal.

In Example 10, the device according to any one of
examples 1 to 9 may optionally further include that the
processor is further configured to enter into a receive-
only mode for the duration of the second device trans-
mitting the isochronous data to the device.

In Example 11, the device according to any one of
examples 1 to 10 may optionally further include that
the isochronous data include a plurality of isochronous
sequences of data packets, that the processor is further
configured to define, for each isochronous sequence of
data packets, a respective reference time point, and that
for each isochronous sequence of data packets, the
respective reference time point and the time-offset
associated with the second device define a starting time
point for the second device to start transmitting the
isochronous sequence of data packets.

In Example 12, the device according example 11 may
optionally further include that each isochronous
sequence of data packets is associated with a respective
data transmission interval.

In Example 13, the device according to any one of
examples 1 to 12 may optionally further include that
the processor is further configured to: define a further
time-offset associated with a third device (e.g., a further
peripheral device); transmit the reference time point
and the further time-offset to the third device; and
receive from the third device further isochronous data
via the communication interface, and the reference time
point and the further time-offset define a further starting
time point for the third device to start transmitting the
further isochronous data.

In Example 14, the device according to example 13 may
optionally further include that the processor is further
configured to: define the time-offset associated with the
second device and the further time-offset associated
with the third device in such a way that the isochronous
data and the further isochronous data do not interfere
with one another.

In Example 15, the device according to example 13 or 14
may optionally further include that the processor is
further configured to: define the time-offset associated
with the second device and the further time-offset
associated with the third device in such a way that data
packets of the isochronous data are interleaved with
further data packets of the further isochronous data.

In Example 16, the device according to any one of
examples 13 to 15 may optionally further include that
the further time-offset associated with the third device
includes a further first time-offset and a further second
time-offset, and the first time-offset associated with the
second device is equal to the further first time-offset
associated with the third device, and the second time-
offset associated with the second device is different
from the further second time-offset associated with the
third device.

In Example 17, the device according to any one of
examples 1 to 16 may optionally further include that
the device is configured to communicate with the
second device according to a short-range wireless com-
munications protocol.

In Example 18, the device according to example 17 may
optionally further include that the short-range wireless
communications protocol is a Bluetooth® communica-
tions protocol. In an exemplary configuration, the
short-range wireless communications protocol may be
a BLE-communications protocol.

In Example 19, the device according to example 18 may
optionally further include that the processor is further
configured to establish a connection with the second
device using the Link Layer of the BLE-communica-
tions protocol.

In Example 20, the device according to example 18 or 19
may optionally further include that the processor is
configured to define a logical transport for the data
transmission from the second device to the device at the
Link Layer of the BLE-communications protocol.

In Example 21, the device according to any one of
examples 18 to 20 may optionally further include that
the processor is further configured to transmit the
time-offset to the second device via the Link Layer of
the BLE-communications protocol.

In Example 22, the device according to any one of
examples 1 to 21 may optionally further include that the processor is further configured to: define data transmission parameters for the data transmission from the second device to the device.

In Example 23, the device according to example 22 may optionally further include that the data transmission parameters include one or more of: a data transmission interval, a number of data packets within a data transmission interval, a time-offset associated with the second device, and/or size of a data packet.

In Example 24, the device according to any one of examples 1 to 23 may optionally further include that the processor is further configured to carry out a negotiation with the second device (e.g., with a processor of the second device), and that the negotiation includes one or more of: a type of the isochronous data, a reliability, a bandwidth for an application configured to run on the second device, and/or a data transmission interval for transmission of the isochronous data.

In Example 25, the device according to example 24 may optionally further include that the processor is configured to carry out the negotiation with the second device via a control signaling connection.

In Example 26, the device according to any one of examples 1 to 25 may optionally further include that the processor is configured to prompt the second device to transmit the isochronous data by transmitting the reference point and the time-offset to the second device.

In Example 27, the device according to any one of examples 1 to 26 may optionally further include that the isochronous data include sensor data.

In Example 28, the device according to example 27 may optionally further include that the sensor data are representative of an absolute value of a physical quantity; and/or that the sensor data are representative of a relative variation of a value of a physical quantity with respect to a previous value of the physical quantity.

In Example 29, the device according to example 28 may optionally further include that the isochronous data include a sequence of data packets; that each data packet in the sequence of data packets includes an absolute value of the physical quantity, or that each data packet of the sequence of data packets includes a relative variation of the value of the physical quantity with respect to the preceding data packet in the sequence of data packets.

In Example 30, the device according to any one of examples 27 to 29 may optionally further include that the sensor data include one or more of: tracking data, pressure data, acceleration data, velocity data, and/or a combination thereof.

In Example 31, the device according to example 30 may optionally further include that the tracking data include absolute coordinates representative of a position of an object; or that the tracking data include relative coordinates representative of a variation in a position of an object with respect to a previous position of the object.

In Example 32, the device according to any one of examples 27 to 31 may optionally further include that the second device includes at least one of: a mouse, a keyboard, a joypad, a joystick, a gaming controller, or a wearable tracking device (e.g., a head tracking device or a body tracking device).

In Example 33, the device according to any one of examples 1 to 32 may optionally further include that the device is a BLE-central device for use in a BLE-network and that the second device is a BLE-peripheral device for use in a BLE-network.

Example 34 is a device (e.g., a central device, for example a central device for use in a BLE-network) including: a communication circuit; a time-definition circuit configured to: define a reference time point for a data transmission from a second device (e.g., a peripheral device, for example a peripheral device for use in a BLE-network) to the device; and define a time-offset associated with the second device; a transmitter circuit configured to transmit the reference time point and the time-offset to the second device; and a receiver circuit configured to receive from the second device isochronous data via the communication interface, and the reference time point and the time-offset define a starting time point for the second device to start transmitting the isochronous data.

In Example 35, the device of example 34 may include one or more features of any one of examples 1 to 33.

Example 36 is a device including: a communication interface configured to communicatively couple the device with a second device; and a processor configured to: receive from the second device an isochronous sequence of data packets via the communication interface, and for each data packet of the sequence of data packets, refrain from transmitting a request signal to the second device for prompting the transmission of the data packet.

In Example 37, the device of example 36 may include one or more features of any one of examples 1 to 33.

Example 38 is a device (e.g., a central device, for example a central device for use in a BLE-network) including: a communication interface configured to communicatively couple the device with a second device; processing means for defining a reference time point for a data transmission from the second device (e.g., a peripheral device, for example a peripheral device for use in a BLE-network) to the device, and for defining a time-offset associated with the second device; transmitting means for transmitting the reference time point and the time-offset to the second device; and receiving means for receiving from the second device isochronous data via the communication interface, and the reference time point and the time-offset define a starting time point for the second device to start transmitting the isochronous data.

In Example 39, the device of example 38 may include one or more features of any one of examples 1 to 33.

Example 40 is a communication manager including a processor configured to: define a reference time point for a data transmission from a second device (e.g., a peripheral device) to a first device (e.g., a central device); define a time-offset associated with the second device; transmit the reference time point and the time-offset to the first device and the second device; and prompt a transmission of isochronous data from the second device to the first device, and the reference time point and the time-offset define a starting time point for the second device to start transmitting the isochronous data.

Example 41 is a device (e.g., a peripheral device, for example a peripheral device for use in a BLE-network) including: a communication interface configured to communicatively couple the device with a first device; and a processor configured to: receive a reference time point for a data transmission from the device to the first device (e.g., a central device, for example a central device for use in a BLE-network); receive a time-offset associated with the device; and transmit to the first device isochronous data via the communication interface, and the reference time point and the time-offset define a starting time point for the device to start transmitting the isochronous data. Illustratively, the processor may be configured to transmit a plurality (e.g., an isochronous sequence) of data packets starting from the starting time point. In an exemplary configuration, the device may include a sensor configured to generate sensor data, and the isochronous data may include the sensor data that the sensor generates.

In Example 42, the device according to example 41 may optionally further include that the time-offset associated with the device includes a first time-offset and a second time-offset, that the first time-offset defines, with respect to the reference time point, an initial time point of a data transmission interval associated with the data transmission from the device to the first device, and that the second time-offset defines, with respect to the initial time point of the data transmission interval, the starting time point for the device to start transmitting the isochronous data.

In Example 43, the device according to example 41 or 42 may optionally further include that the isochronous data include a plurality of data packets, and that the data packets of the plurality of data packets are spaced at isochronous time intervals with respect to one another.

In Example 44, the device according to example 43 may optionally further include that the processor is further configured to: receive an integrity signal from the first device after a transmission from the device of a predefined number of data packets, and the integrity signal is representative of an integrity of a reception at the first device of the transmitted data packets.

In Example 45, the device according to example 44 may optionally further include that in case the integrity signal is representative of an integrity of the reception of at least one data packet of the transmitted data packets being outside a predefined integrity range, the processor is further configured to retransmit the at least one data packet.

In Example 46, the device according to example 43 or 44 may optionally further include that in case the integrity signal is representative of an integrity of the reception of at least one data packet of the transmitted data packets being outside a predefined integrity range, the processor is further configured to retransmit at least part of the plurality of data packets starting from the at least one data packet.

In Example 47, the device according to any one of examples 43 to 46 may optionally further include that the processor is further configured to: for each data packet of the plurality of data packets, transmit the data packet without waiting for a request signal from the first device.

In Example 48, the device according to any one of examples 43 to 47 may optionally further include that the processor is further configured to: for each data packet of the plurality of data packets, transmit the data packet without waiting for a feedback signal from the first device.

In Example 49, the device according to example 48 may optionally further include that the feedback signal includes one of an acknowledgment signal or a negative acknowledgment signal.

In Example 50, the device according to any one of examples 41 to 49 may optionally further include that the processor is further configured to: enter into a transmit-only mode for the duration of the device transmitting the isochronous data to the first device.

In Example 51, the device according to any one of examples 41 to 50 may optionally further include that the isochronous data include a plurality of isochronous sequences of data packets, that the processor is further configured to receive, for each isochronous sequence of data packets, a respective reference time point, and that, for each isochronous sequence of data packets, the respective reference time point and the time-offset associated with the device define a starting time point for the device to start transmitting the isochronous sequence of data packets.

In Example 52, the device according to example 51 may optionally further include that each isochronous sequence of data packets is associated with a respective data transmission interval.

In Example 53, the device according to any one of examples 41 to 52 may optionally further include that the device is configured to communicate with the first device according to a short-range wireless communications protocol.

In Example 54, the device according to example 53 may optionally further include that the short-range wireless communications protocol is a Bluetooth® communications protocol. In an exemplary configuration, the short-range wireless communications protocol may be a BLE-communications protocol.

In Example 55, the device according to example 54 may optionally further include that the processor is further configured to establish a connection with the first device using the Link Layer of the BLE-communications protocol.

In Example 56, the device according to example 54 or 55 may optionally further include that the processor is further configured to receive the time-offset (e.g., from the first device) via the Link Layer of the BLE-communications protocol.

In Example 57, the device according to any one of examples 41 to 56 may optionally further include that the processor is further configured to: receive data transmission parameters for the data transmission from the device to the first device.

In Example 58, the device according to example 57 may optionally further include that the data transmission parameters include one or more of: a data transmission interval, a number of data packets within a data transmission interval, a time-offset associated with the device, and/or size of a data packet.

In Example 59, the device according to any one of examples 41 to 58 may optionally further include that the processor is further configured to carry out a negotiation with the first device, and that the negotiation includes one or more of: a type of the isochronous data, a reliability, a bandwidth for an application configured to run on the device, and/or a data transmission interval for transmission of the isochronous data.

In Example 60, the device according to example 59 may optionally further include that the processor is configured to carry out the negotiation with the first device via a control signaling connection.

In Example 61, the device according to any one of examples 41 to 60 may optionally further include that the isochronous data include sensor data.

In Example 62, the device according to example 61 may optionally further include that the sensor data are representative of an absolute value of a physical quantity; and/or that the sensor data are representative of a relative variation of a value of a physical quantity with respect to a previous value of the physical quantity.

In Example 63, the device according to example 62 may optionally further include that the isochronous data include a sequence of data packets; that each data packet in the sequence of data packets includes an absolute value of the physical quantity; or that each data packet of the sequence of data packets includes a relative variation of the value of the physical quantity with respect to the preceding data packet in the sequence of data packets.

In Example 64, the device according to any one of examples 61 to 63 may optionally further include that the sensor data include one or more of: tracking data, pressure data, acceleration data, velocity data, and/or a combination thereof.

In Example 65, the device according to example 64 may optionally further include that the tracking data include absolute coordinates representative of a position of an object; or that the tracking data include relative coordinates representative of a variation in a position of an object with respect to a previous position of the object.

In Example 66, the device according to any one of examples 41 to 65 may optionally further include that the device includes at least one of: a mouse, a keyboard, a joypad, a joystick, a gaming controller, or a wearable tracking device (e.g., a head tracking device or a body tracking device).

In Example 67, the device according to any one of examples 41 to 66 may optionally further include that the first device is a BLE-central device for use in a BLE-network and that the device is a BLE-peripheral device for use in a BLE-network.

Example 68 is a device (e.g., a peripheral device, for example a peripheral device for use in a BLE-network) including: a communication interface; and a processor configured to: transmit to a first device an isochronous sequence of data packets via the communication interface, and for each data packet of the sequence of data packets, transmit the data packet without waiting for a request signal from the first device prompting the transmission of the data packet.

In Example 69, the device of example 68 may include one or more features of any one of examples 41 to 67.

Example 70 is a device (e.g., a peripheral device, for example a peripheral device for use in a BLE-network) including: a communication interface; receiving means for receiving a reference time point for a data transmission from the device to a first device (e.g., a central device, for example a central device for use in a BLE-network), and for receiving a time-offset associated with the device; and transmitting means for transmitting to the first device isochronous data via the communication interface, and the reference time point and the time-offset define a starting time point for the device to start transmitting the isochronous data.

In Example 71, the device of example 70 may include one or more features of any one of examples 41 to 67.

Example 72 is a device (e.g., a peripheral device, for example a peripheral device for use in a BLE-network) including: a communication interface; a receiver circuit configured to receive a reference time point for a data transmission from the device to a first device (e.g., a central device, for example a central device for use in a BLE-network), and to receive a time-offset associated with the device; and a transmitter circuit configured to transmit to the first device isochronous data via the communication interface, and the reference time point and the time-offset define a starting time point for the device to start transmitting the isochronous data.

Example 73 is a communication system including: a first device according to any one of examples 1 to 33 and a second device according to any one of examples 41 to 67, and the first device and the second device are communicatively coupled with one another via the respective communication interface.

Example 74 is a method of managing a data transmission from a second device to a first device, the method including: defining a reference time point for the data transmission from the second device to the first device; defining a time-offset associated with the second device, the reference time point and the time-offset define a starting time point for the second device to start the data transmission; and carrying out the data transmission from the second device to the first device in accordance with the starting time point, and the data transmission includes transmitting isochronous data from the second device to the first device.

In Example 75, the method of example 74 may include one or more features of any one of examples 1 to 73, adapted accordingly.

Example 76 is a non-transitory computer-readable medium or a computer program product including instructions which, when the program is executed by a computer, cause the computer to carry out the method of example 74 or 75.

Example 77 is a method of managing a data transmission from a second device to a first device, the method including: defining a reference time point for the data transmission from the second device to the first device; defining a time-offset associated with the second device, and the reference time point and the time-offset define a starting time point for the second device to start the data transmission; and receiving isochronous data at the first device.

In Example 78, the method of example 77 may include one or more features of any one of examples 1 to 73, adapted accordingly.

Example 79 is a non-transitory computer-readable medium or a computer program product including instructions which, when the program is executed by a computer, cause the computer to carry out the method of example 77 or 78.

Example 80 is a method of managing a data transmission from a second device to a first device, the method including: defining a reference time point for the data transmission from the second device to the first device; defining a time-offset associated with the second device, and the reference time point and the time-offset define a starting time point for the second device to start the data transmission; and transmitting isochronous data via the second device based on the starting time point.

In Example 81, the method of example 80 may include one or more features of any one of examples 1 to 73, adapted accordingly.

Example 82 is a non-transitory computer-readable medium or a computer program product including instructions which, when the program is executed by a computer, cause the computer to carry out the method of example 80 or 81.

Example 83 is a device (e.g., a central device, for example a central device for use in a BLE-network) including: a processor configured to: define a reference time point for a data transmission from a second device (e.g., a peripheral device, for example a peripheral device for use in a BLE-network) to the device; define a time-offset associated with the second device; transmit the reference time point and the time-offset to the second device; and receive from the second device isochronous data, and the reference time point and the time-offset define a starting time point for the second device to start transmitting the isochronous data.

Example 84 is a device (e.g., a peripheral device, for example a peripheral device for use in a BLE-network) including: a processor configured to: receive a reference time point for a data transmission from the device to a first device (e.g., a central device, for example a central device for use in a BLE-network); receive a time-offset associated with the device; and transmit to the first device isochronous data, and the reference time point and the time-offset define a starting time point for the device to start transmitting the isochronous data.

The term "data" as used herein, for example in relation to "isochronous data", may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as used herein may be understood as any kind of technological entity that allows handling of data. The data may be handled according to one or more specific functions that the processor may execute. Further, a processor as used herein may be understood as any kind of circuit, e.g., any kind of analog or digital circuit. A processor may thus be or include an analog circuit, digital circuit, mixed-signal circuit, logic circuit (e.g., a hard-wired logic circuit or a programmable logic circuit), microprocessor (for example a Complex Instruction Set Computer (CISC) processor or a Reduced Instruction Set Computer (RISC) processor), Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. A "processor" may also be a logic-implementing entity executing software, for example any kind of computer program, for example a computer program using a virtual machine code such as for example Java. A "processor" as used herein may also include any kind of cloud-based processing system that allows handling of data in a distributed manner, e.g. with a plurality of logic-implementing entities communicatively coupled with one another (e.g. over the internet) and each assigned to handling the data or part of the data. By way of illustration, an application running on a server and the server can also be a "processor". Any other kind of implementation of the respective functions, which will be described below in further detail, may also be understood as a processor. It is understood that any two (or more) of the processors detailed herein may be realized as a single entity with equivalent functionality or the like, and conversely that any single processor detailed herein may be realized as two (or more) separate entities with equivalent functionality or the like.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Furthermore, it is appreciated that registers, shift registers, processor registers, data buffers, among others, are also embraced herein by the term memory. It is also appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

In the present disclosure, various aspects are described with terminology that may pertain to particular radio communication technologies, e.g. with terminology that may pertain to the Bluetooth® context. It is however understood that the aspects described herein may correspondingly apply to other radio communication technologies, in which same (e.g., structurally same and/or functionally same) components, structures, operations, logic entities, etc. may be referred to with other terms pertaining to the other radio communication technologies.

The present disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the examples described herein. For purposes of this disclosure, radio communication technologies may be classified as one of a Short Range radio communication technology or Cellular Wide Area radio communication technology. Short Range radio communication technologies may include Bluetooth®, WLAN (e.g., according to any IEEE 802.11 standard), and other similar radio communication technologies. Exemplary Cellular Wide Area radio communication technologies that the present disclosure may utilize include, but are not limited to: Long Term Evolution (LTE), Long Term Evolution-Advanced (LTE-A), 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSDPA Plus (HSDPA+), HSUPA (High-Speed Uplink Packet Access), HSUPA Plus (HSUPA+), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), WITS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Zigbee, Bluetooth®, Wireless Gigabit Alliance (WiGig) standard, Worldwide Interoperability for Microwave Access (WiMax) (e.g., according to an IEEE 802.16 radio communication standard, e.g., WiMax fixed or WiMax mobile), mmWave standards in general (wireless systems operating at 10-90 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, etc. Cellular Wide Area radio communication technologies also include "small cells" of such technologies, such as microcells, femtocells, and picocells. Cellular Wide Area radio communication technologies may be generally referred to herein as "cellular" communication technologies. As used herein, a first radio communication technology may be different from a second radio communication technology if the first and second radio communication technologies are based on different communication standards.

The present disclosure may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data over a software-level connection with another processor in the form of radio signals, where radio-layer components carry out the physical transmission and reception, such as radio frequency (RF) transceivers and antennas, and the processors perform the logical transmission and reception over the software-level connection.

The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions.

The term "calculate" encompasses both 'direct' calculations via a mathematical expression/formula/relationship and 'indirect' calculations via lookup or hash tables and other array indexing or searching operations.

As utilized herein, the term "derived from" designates being obtained directly or indirectly from a specific source. Accordingly, data derived from a source includes data obtained directly from the source or indirectly from the source, i.e. through one or more secondary agents.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. For instance, the phrase "a plurality" may be understood to include a numerical quantity greater than or equal to two (e.g., two, three, four, five, [ . . . ], etc.). The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

As used herein, a signal (e.g., data) that is "indicative of" or "representative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" or "representative of" some quantity, state, or parameter may be physically embodied as a digital signal, an analog signal, or stored bits that encode or otherwise communicate the value.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A device comprising:
a communication interface configured to communicatively couple the device with a peripheral device; and
a processor configured to:
determine a reference time point for a data transmission from the peripheral device to the device;

determine a time-offset associated with the peripheral device;

transmit the reference time point and the time-offset to the peripheral device;

enter into a receive-only mode;

receive from the peripheral device isochronous data via the communication interface; and terminate entry into the receive only mode upon receipt of a termination message from the peripheral device, wherein the reference time point and the time-offset define a starting time point for the peripheral device to start transmitting the isochronous data.

2. The device according to claim 1, wherein the time-offset associated with the peripheral device comprises a first time-offset and a second time-offset, wherein the first time-offset defines, with respect to the reference time point, an initial time point of a data transmission interval associated with the data transmission from the peripheral device to the device, and wherein the second time-offset defines, with respect to the initial time point of the data transmission interval, the starting time point for the peripheral device to start transmitting the isochronous data.

3. The device according to claim 1, wherein the isochronous data comprise a plurality of data packets, wherein the data packets of the plurality of data packets are spaced at isochronous time intervals with respect to one another.

4. The device according to claim 3, wherein the processor is further configured to:

transmit an integrity signal to the peripheral device after a transmission from the peripheral device of a predefined number of data packets, wherein the integrity signal is representative of an integrity of a reception at the device of the data packets.

5. The device according to claim 4, wherein in case the integrity signal is representative of an integrity of the reception of at least one data packet of the data packets being outside a predefined integrity range, the processor is further configured to prompt the peripheral device to retransmit at least part of the plurality of data packets starting from the at least one data packet.

6. The device according to claim 3, wherein the processor is further configured to, for each data packet of the plurality of data packets, refrain from transmitting a request signal to the peripheral device for prompting the transmission of the data packet.

7. The device according to claim 1, wherein the processor is further configured to:

define a further time-offset associated with a further peripheral device;

transmit the reference time point and the further time-offset to the further peripheral device; and receive from the further peripheral device further isochronous data via the communication interface, wherein the reference time point and the further time-offset define a further starting time point for the further peripheral device to start transmitting the further isochronous data.

8. The device according to claim 1, wherein the device is a Bluetooth Low Energy (BLE) central device for use in a BLE network, and wherein the peripheral device is a BLE peripheral device for use in the BLE network.

9. A peripheral device comprising:

a communication interface configured to communicatively couple the peripheral device with a central device; and a processor configured to:

receive a reference time point for a data transmission from the peripheral device to the central device;

receive a time-offset associated with the peripheral device;

enter into a transmit-only mode based upon receipt of the time-offset;

transmit to the central device isochronous data via the communication interface; and transmit a termination message from to the central device upon receipt of a termination event at the peripheral device, wherein the reference time point and the time-offset define a starting time point for the peripheral device to start transmitting the isochronous data.

10. The peripheral device according to claim 9, wherein the isochronous data comprise a plurality of data packets, wherein the data packets of the plurality of data packets are spaced at isochronous time intervals with respect to one another.

11. The peripheral device according to claim 10, wherein the processor is further configured to:

receive an integrity signal from the device after a transmission from the peripheral device of a predefined number of data packets, wherein the integrity signal is representative of an integrity of a reception at the device of the data packets.

12. The peripheral device according to claim 11, wherein in case the integrity signal is representative of an integrity of the reception of at least one data packet of the data packets being outside a predefined integrity range, the processor is further configured to retransmit at least part of the plurality of data packets starting from the at least one data packet.

13. The peripheral device according to claim 10, wherein the processor is further configured to, for each data packet of the plurality of data packets, transmit the data packet without waiting for a request signal from the device.

14. The peripheral device according to claim 9, wherein the device is a Bluetooth Low Energy (BLE) central device for use in a BLE network, and wherein the peripheral device is a BLE peripheral device for use in the BLE network.

15. A method of managing a data transmission from a second device to a first device, the method comprising:

determining a reference time point for the data transmission from the second device to the first device;

determining a time-offset associated with the second device, wherein the reference time point and the time-offset define a starting time point for the second device to start the data transmission; and carrying out the data transmission from the second device to the first device in accordance with the starting time point, wherein the data transmission comprises transmitting isochronous data from the second device to the first device, while refraining from transmitting a request signal for prompting transmission of the data transmission.

16. The method according to claim 15, wherein the isochronous data comprise a plurality of data packets, and wherein the method further comprises for each data packet of the plurality of data packets, refraining, by the first device, from transmitting a request signal to the second device for prompting the transmission of the data packet.

17. The method according to claim 16, further comprising:

transmitting, by the second device, each data packet without waiting for a corresponding request signal from the first device.

18. The method according to claim 15, wherein the first device is a Bluetooth Low Energy (BLE) central device for use in a BLE network, and wherein the second device is a BLE peripheral device for use in the BLE network.

\* \* \* \* \*